US008284739B2

(12) United States Patent
Doyle et al.

(10) Patent No.: US 8,284,739 B2
(45) Date of Patent: Oct. 9, 2012

(54) METHOD AND APPARATUS FOR AFFILIATING A WIRELESS DEVICE WITH A WIRELESS LOCAL AREA NETWORK

(75) Inventors: James Doyle, Toronto (CA); William Yuen, Scarborough (CA); James Ward Girardeau, Jr., Austin, TX (US)

(73) Assignee: VIXS Systems, Inc., Toronto, Ontario (CA)

( * ) Notice: Subject to any disclaimer, the term of this patent is extended or adjusted under 35 U.S.C. 154(b) by 985 days.

(21) Appl. No.: 10/376,400

(22) Filed: Feb. 28, 2003

(65) Prior Publication Data
US 2004/0125777 A1 Jul. 1, 2004
US 2011/0310862 A9 Dec. 22, 2011

Related U.S. Application Data

(63) Continuation-in-part of application No. 09/864,524, filed on May 24, 2001, now Pat. No. 7,099,951.

(60) Provisional application No. 60/437,381, filed on Dec. 31, 2002.

(51) Int. Cl.
*H04W 4/00* (2009.01)
(52) U.S. Cl. ........................................ 370/338; 370/431
(58) Field of Classification Search .................. 370/338, 370/343–344, 431
See application file for complete search history.

(56) References Cited

U.S. PATENT DOCUMENTS

| 7,453,844 | B1 * | 11/2008 | Lee et al. ...................... 370/329 |
| 2002/0071448 | A1 * | 6/2002 | Cervello et al. ................ 370/445 |
| 2002/0085516 | A1 * | 7/2002 | Bridgelall ...................... 370/329 |
| 2004/0024871 | A1 * | 2/2004 | Kitchin ............................ 709/225 |
| 2004/0052210 | A1 * | 3/2004 | Kasera et al. .................. 370/235 |
| 2004/0053624 | A1 * | 3/2004 | Frank et al. .................... 455/453 |
| 2004/0093418 | A1 * | 5/2004 | Tuomi .............................. 709/228 |

* cited by examiner

*Primary Examiner* — Kevin C Harper
(74) *Attorney, Agent, or Firm* — Garlick & Markison; Timothy W. Markison; Jessica W. Smith

(57) ABSTRACT

The present invention provides a system and method for affiliating a wireless device with a wireless local area network (WLAN). An embodiment of the method of this invention comprises establishing, at a control node of the WLAN, access frequency(s) for affiliation with the WLAN. The control node periodically provides a beacon frame on the access frequency(s) that indicates the timing of affiliation with the WLAN. The wireless device determines the access frequency (s) for affiliating with the WLAN and the timing of affiliation with the WLAN based on the beacon frame. The wireless device provides self identification information via the access frequency during the beacon frame. This allows the control node to determine the access privileges of the wireless device based on the identification information. Finally, the control node affiliates the wireless device with an initial access channel from a set of access channels in accordance with the access privileges.

3 Claims, 24 Drawing Sheets

Example of Inefficent PCF time allocation

Efficent PCF time allocation

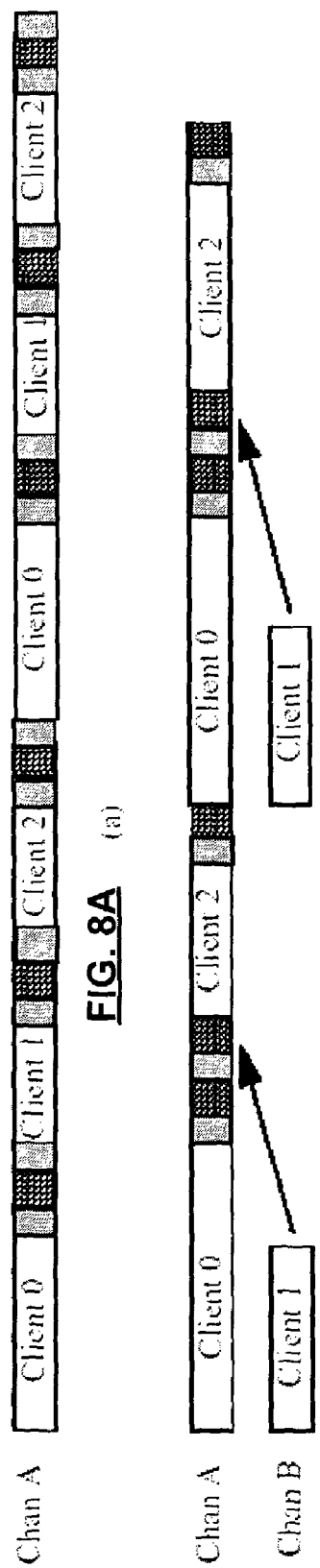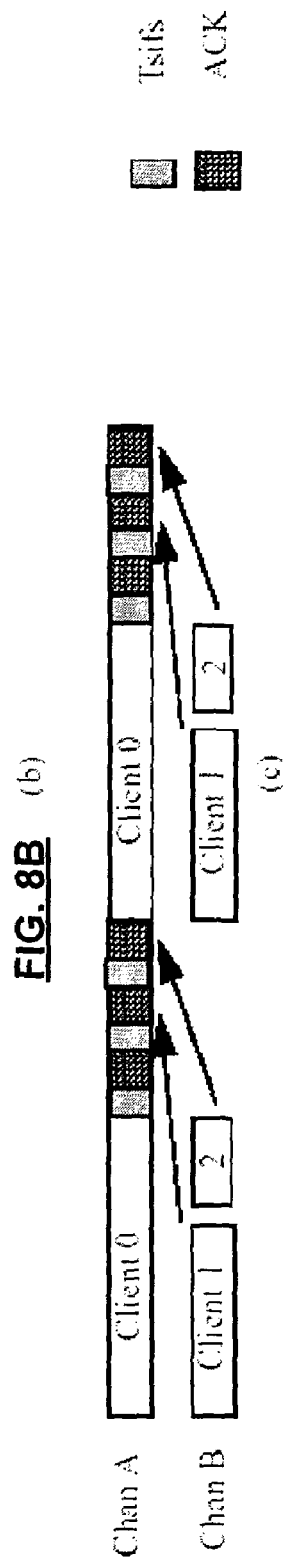
FIG. 8A (a)
FIG. 8B (b)
FIG. 8C (c)

Example of QoS

METHOD AND APPARATUS FOR AFFILIATING A WIRELESS DEVICE WITH A WIRELESS LOCAL AREA NETWORK

The present U.S. Utility Patent Application claims priority pursuant to 35 U.S.C. §120, as a continuation-in-part application, to U.S. Utility application Ser. No. 09/864,524, entitled "METHOD AND APPARATUS FOR MULTIMEDIA SYSTEM," filed May 24, 2001, issued as U.S. Pat. No. 7,099,951. The present U.S. Utility Patent Application claims priority pursuant to 35 U.S.C. §119(e) to U.S. Provisional Application Ser. No. 60/437,381, entitled "METHOD AND APPARATUS FOR AFFILIATING A WIRELESS DEVICE WITH A WIRELESS LOCAL AREA NETWORK," filed Dec. 31, 2002.

TECHNICAL FIELD OF THE INVENTION

This invention relates generally to communication systems and, more particularly, to a system and method of affiliating a wireless device with a wireless local area network.

BACKGROUND OF THE INVENTION

Communication systems are known to convey data from one entity to another. The data may be audio data, video data and/or text data. In such communication systems, the one or more transmission mediums (e.g., radio frequencies, coaxial cable, twisted pair copper wire, fiber optic cabling, et cetera) transmit data in accordance with one or more data transmission protocols. The distance over which the data traverses within a communication system may be inches, feet, miles, tens of miles, hundreds of miles, thousands of miles, et cetera.

As is also known, communication systems have two basic configurations: wide area networks (WANs) and local area networks (LANs). In addition, WAN and/or LAN communication systems may use a variety of transmission types including broadcast transmissions, asymmetrical transmissions, and symmetrical transmissions. In a broadcast communication system, a network hub transmits data to a plurality of users with little or no data being transmitted from the users to the network hub. Examples of broadcast communication systems include radio systems, NTSC (national television standards committee) television systems (e.g., regular TV), high definition television systems, cable systems, and satellite systems. In each of these broadcast communication systems, a network hub (e.g., radio station, television station, et cetera) transmits a broadcast signal. Any user within range of the broadcast signal and who has an appropriate receiver (e.g., radio, television, et cetera) can receive the broadcast signal. Such broadcast systems employ a particular data transmission protocol such as amplitude modulation, frequency modulation, ultra-high frequency, very high frequency, et cetera.

Asymmetrical communication systems transmit more data in one direction than in another (i.e., one entity transmits more data to other entities than it receives from each of the other entities). An example of an asymmetrical communication system is the Internet, where web servers transmit substantially more data than they receive from any one user. The Internet uses TCP/IP as its data transmission protocol, while a variety of physical layer data transmission protocols may be used to access the Internet. Such physical layer data transmission protocols include asynchronous transfer mode (ATM), frame relay, integrated services digital network (ISDN), digital subscriber loop (DSL) and all derivatives thereof, and multiple packet label switching (MPLS). Such asymmetrical communication systems may be wide area networks (e.g., the Internet), or local area networks (e.g., local server based system).

Symmetrical communication systems include a plurality of users where the data flow between any of the users could be equal. Examples of symmetrical communication systems include public switch telephone network (PSTN), local computer networks, cellular telephone systems, intercom systems, private branch exchanges (PBX), et cetera. Such symmetrical communication systems use at least one data transmission protocol. For example, a computer network may utilize any one of the Ethernet standards.

In any type of communication system, a user must have the appropriate receiving and possibly transmitting equipment to independently access the communication system. For example, a user of a satellite television system must have a satellite receiver and a television to receive satellite broadcast. If another television is to independently access the satellite broadcast, it needs its own satellite receiver. The same is true for NTSC broadcast, cable broadcast, et cetera, although currently most televisions include an NTSC tuner and/or some form of cable tuner.

The number of households having multiple television sets is continually increasing, and many users want to have the latest and greatest video viewing services. As such, many households have multiple satellite receivers, cable set-top boxes, modems, et cetera. As is further known, dependent multiple access to satellite broadcasts may be achieved by linking slave televisions to a master television. The master television has full control of, and independent access to, the satellite receiver, while the slave televisions receive whatever channel has been selected by the master.

Similarly, for in-home Internet access, each computer or Internet device can have its own Internet connection. As such, each computer or Internet device includes a modem. As an alternative to each computer having its own modem, an in-home local area network may be used to provide Internet access. In such an in-home local area network, each computer or Internet device includes a network card to access a server. The server provides the coupling to the Internet.

In-home local area networks use one or more of telephone lines, radio frequencies, power lines, wireless and/or infrared connections as the communication medium. Such in-home local area networks are typically used to facilitate in-home computer networks that couple a plurality of computers with one or more peripherals. As such, entertainment-type data transmissions (e.g., from VCRs, DVDs, et cetera) are not typically supported by the in-home local area network.

In particular, wireless communication systems are becoming increasingly commonplace in public and private use. Wireless communication systems can include numerous wireless communication devices. The wireless communication devices include, but are not limited to, radios, cellular telephones, stations coupled to personal computers, laptops, personal digital assistants, et cetera, that communicate amongst one another via wireless communication channels administered by wireless infrastructure devices. Such wireless infrastructure devices can include base stations (e.g., for cellular wireless communication systems), access points (e.g., for wireless local area networks), and system controllers. The wireless infrastructure devices operate in accordance with one or more communication standards. For instance, wireless communication systems may operate in accordance with one or more standards including, but not limited to, IEEE 802.11, Bluetooth, advance mobile phone service (AMPS), digital AMPS, global system for mobile communication (GSM), code division multiple access (CDMA), local multi-point distribution systems (LMDS), multi-channel-multi-point distribution systems (MMDS), and/or variations thereof. A single wireless base station or access point can transmit simultaneously to multiple wireless communication devices (client devices).

Depending on the type of wireless communication system, a wireless communication device communicates directly or indirectly with other wireless communication devices. For direct communications (also known as point-to-point communications), the participating wireless communication devices tune their receivers and transmitters to the same channel or multiple channels (e.g., one or more of the plurality of radio frequency (RF) carriers utilized by the wireless communication system) and communicate over that channel or channels. For indirect wireless communications, each wireless communication device communicates directly with an associated base station (e.g., for cellular services) and/or an associated access point (e.g., for an in-home or in-building, wireless network) via an assigned channel, or channels. To complete a communication connection between wireless communication devices, the associated base stations and/or associated access points communicate with each other directly, via a system controller, the public switch telephone network, the internet, and/or some other wide area network known to those skilled in the art.

For each wireless communication device to participate in wireless communications, the device includes or is coupled to a radio transceiver. (i.e., receiver and transmitter) Receivers receive RF signals, demodulate the RF carrier frequency from the RF signals to produce baseband signals, and demodulate the baseband signals in accordance with a particular wireless communication standard to recapture the transmittal data. A radio receiver may include a low noise amplifier, one or more intermediate frequency states, filters and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The receiver baseband processor, in accordance with a particular wireless communication standard, decodes and/or demodulates the baseband signals to recapture data therefrom.

As is also known, the transmitter converts data into RF signals by modulating the data to produce baseband signals and mixing the baseband signals with an RF carrier. The radio transmitter includes a baseband processor, one or more intermediate frequency stages, filters, and a power amplifier coupled to an antenna. The baseband processor encodes and/or modulates, in accordance with a wireless communication standard such as IEEE 802.11a, IEEE 802.11b, Bluetooth, Global System for Mobile communications (GSM), Advanced Mobile Phone Service (AMPS), et cetera, to produce baseband signals. The baseband processor produces an outbound baseband signal at a given processing rate. Typically, the processing rate of the transmitting baseband processor is synchronized with the transmitting local oscillation or oscillations and is a fraction of the local oscillation, or oscillations. The one or more intermediate frequency stages mix the baseband signals with one or more local oscillations to produce a radio frequency signal. The filter filters the radio frequency signal to remove unwanted frequency components and the power amplifier amplifies the filtered radio frequency signal prior to transmission via the antenna.

Further, data transmissions comprise serial streams of data, but within a network component (e.g., switch, relay, bridge, gateway, et cetera) the data is processed in parallel. It is a function of the transceiver within each communication device or network component to convert data from a serial to a parallel form, or vice-versa. In general, the transmitter converts parallel data into serial data and sources the serial data onto a communications link. A receiver receives serial data via a communications link and coverts it into parallel data.

However, wireless transmission systems can suffer from signal degradation and possible data corruption when simultaneously transmitting to multiple devices along channels whose resources are not allocated based on the number and needs of the client devices sharing the one or more wireless channels. For example, a wireless communication system's resources can be allocated differently based on the degree of channel usage and the type of wireless client being served, to maximize the quality of service delivered to each client. Further, usage and client type can vary over time. For example, a wireless communication system may only have a single client device requesting channel resources. Channel allocation in this case is relatively simple—the single client can be granted all available channel resources. However, if a second client subsequently comes on line, the wireless transmission system must reallocate channel resources to provide a sufficient quality of service to both clients, based on the possibly differing needs of each. Further, the needs of each client could change over time, with one client or the other requesting more or less channel resources. Further still, each client may require different minimum levels of channel resources to operate properly.

Thus, a critical aspect of any channel allocation scheme is the initial affiliation of a wireless device requesting service from a wireless network. Because each device seeking to access a wireless network can have differing capabilities, such as maximum and minimum data transmission and reception rates, and differing quality of service ("QoS") needs, it is desirable to initially affiliate each client with a channel that is closely matched to the needs of the client and to the needs of the network as a whole. For example, a laptop computer accessing a local database will require far less bandwidth and access time than a high definition television requesting a broadcast program from the network. Therefore, it is likely a better use of channel resources to not group client devices having heavy duty cycles and requiring substantial channel resources, when compared to other clients, together on the same channel. Instead, it may be desirable to initially group together some light duty cycle clients and a heavy duty cycle client on a channel to more efficiently allocate channel resources at the time of first access by a device and for more efficient subsequent reallocation of channel resources.

Currently existing channel allocation systems do not provide for such an initial assessment of client devices upon first access to a wireless network, nor do they provide for real-time adjustments to the allocation of channel resources to take into account the time-changing needs of client devices and channel resources. For example, it may become necessary to drop service to one or more client devices in order to provide service to a higher priority client device requesting to join a network. Such client priority may be desired by a user or a system administrator. Alternatively, it may be desirable to refuse network access to a client device seeking to affiliate itself with the wireless network. For instance, it may be desirable to reserve channel resources for certain client devices, or to allocate channel resources based on an arbitrary criteria such that differing quality of service is delivered to each client device based on a preset priority scheme. Currently existing channel affiliation and channel allocation systems and methods do not provide this functionality.

Therefore, a need exists for a method and apparatus for affiliating a device with a wireless communication system that can reduce or eliminate the problems associated with the prior art. The solution for this need may further overcome the above-mentioned issues to offer additional wireless communication services within a wireless local area network.

BRIEF SUMMARY OF THE INVENTION

The present invention provides a system and method for affiliating a wireless device with a wireless local area network ("WLAN"). The method involves first establishing, by a control node of the WLAN, an access frequency(s) for affiliation with the WLAN. The control node periodically provides a beacon frame on the access frequency that indicates the timing of affiliation with the WLAN. A wireless device seeking to access the WLAN determine the access frequency(s) for affiliating with the WLAN and the timing of affiliation with the WLAN based on the beacon frame. The wireless device then provides self-identification information via the access frequency obtained from the beacon frame. This allows the control node to determine the access privileges of the wireless device based on the identification information. Finally, the control node affiliates the wireless device with an initial access channel from a set of access channels in accordance with the determined access privileges. In some cases, the control node may ignore identification information received on non-access frequency(s). These non-access frequency(s) may be identified by the absence of the beacon frame.

Affiliating the wireless device with the initial access channel may further include selecting the initial access channel for affiliation with the wireless device based on at least one of: an existing load on the set of access channels, correlating a service request from the wireless device with a service request for the initial access channel, the wireless device identification information, and a wireless device group identification.

The present invention may further comprise establishing, by the control node, a unique frequency to function as the at least one access frequency for affiliation with the WLAN. The control node may further provide a transfer acknowledgement signal to the wireless device in response to receiving the identification information. The control node may also provide a change channel affiliation signal to the wireless device to transfer the wireless device to a second access channel, from the set of access channels, different from the initial access channel.

Embodiments of this invention can also comprise an apparatus for affiliating a wireless device with a wireless local area network. The apparatus can include a processing module operably coupled to a memory, wherein the memory includes operational instructions that cause the processing module to establish, at a control node of the WLAN, an access frequency for affiliation with the WLAN and periodically provide a beacon frame on the access frequency, wherein the beacon indicates timing of affiliation with the WLAN. The wireless device determines the access frequency for affiliating, and the timing of affiliation, with the WLAN based on the beacon frame. This enables the wireless device to provide identification information to the control node via the access frequency obtained from the beacon frame. The control node executes instructions that determine the access privileges of the wireless device based on the identification information and affiliates the wireless device with an initial access channel from a set of access channels in accordance with the access privileges.

BRIEF DESCRIPTION OF THE DRAWINGS

FIGS. 8A, 8B and 8C depict various schemes for distributing data while sharing channels within the present invention;

DETAILED DESCRIPTION OF THE INVENTION

Figure 1:
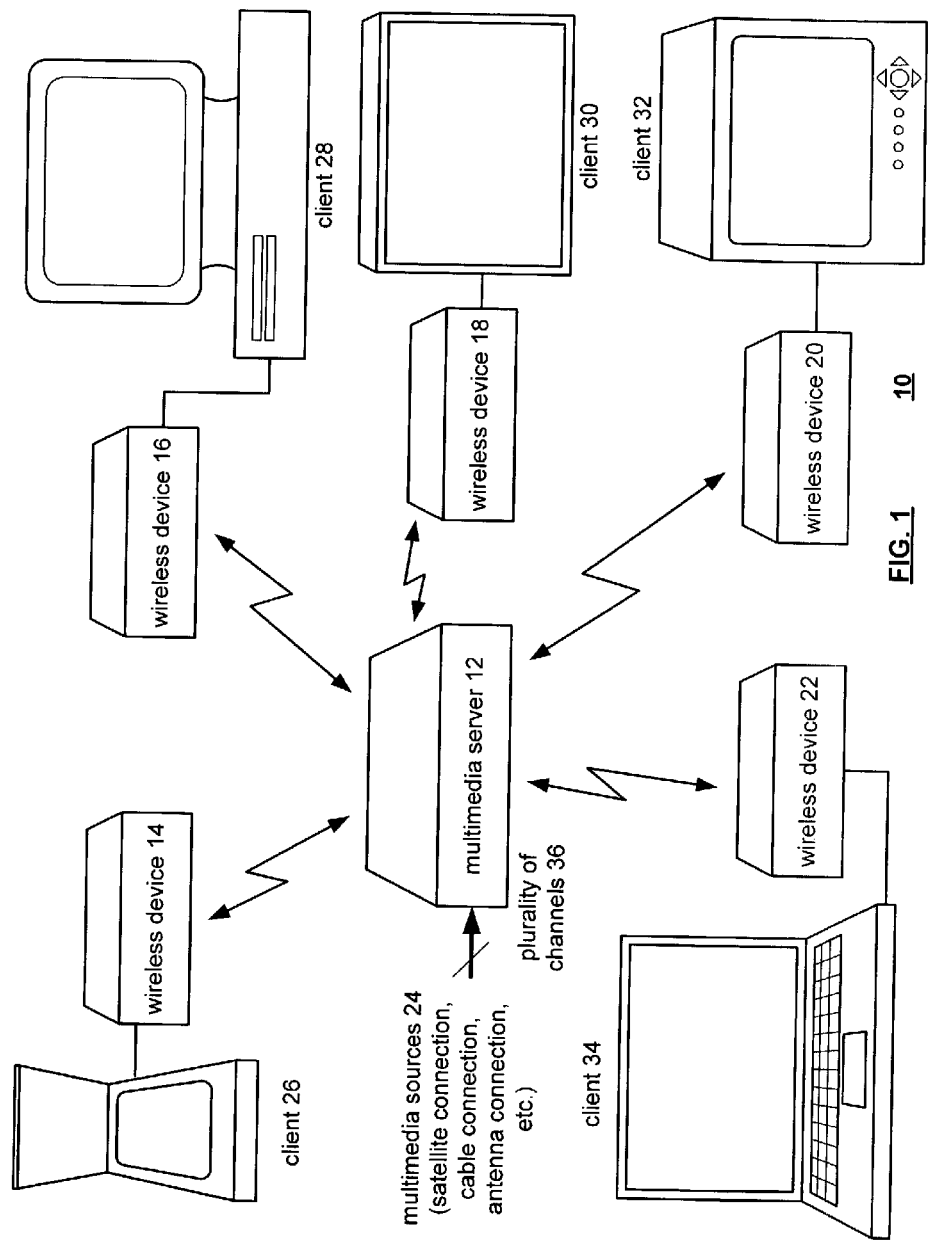
FIG. 1 illustrates a schematic block diagram of a multimedia system in accordance with the present invention.

Generally, the present invention provides a method and apparatus for affiliating wireless devices with a WLAN when providing multimedia services. Such a method and apparatus include processing that begins by receiving a plurality of channels from at least one multimedia source. For example, the plurality of channels may be received via a satellite connection, cable connection, NTSC broadcast, et cetera. The processing continues by receiving a selection request(s) from at least one client module via a communication path via a local area network such as a LAN or WLAN. The client module is affiliated with a client device such as a television, computer, laptop computer, monitor, personal digital assistant, et cetera. In particular, the client module may comprise a wireless device.

Such a wireless device must first be affiliated with a WLAN in order to receive data over the WLAN. To accomplish this affiliation, first at least one frequency for affiliation with the WLAN is established by a control node. The control node also provides a beacon frame on the established frequency(s) that indicates the timing of affiliation with the WLAN. The wireless device must then determine the frequency for, and timing of, affiliation with the WLAN based on the beacon frame. Next, the wireless device identifies itself to and provides information about itself to the control node. From this information the control node may determine the access privileges and access channel for the wireless device. The access channel is selected based on the available existing channels and their current capacity or bandwidth and current usage or load. The channel selection may be changed by the control node dependent on changing loads within the WLAN if needed to more efficiently handle current or changing demands.

The process can further generate a set of channel select commands from the client module select request. The generation of the set of channel select commands includes interpreting the selection request, verifying the authenticity of the wireless device transmitting the request, and determining appropriate access privileges for the respective client. The processing continues by selecting a set of channels from the plurality of channels based on the set of channel select commands. As such, of all the channels available, only a few are selected, i.e., the ones chosen by the wireless devices, to comprise the set of channels.

The selected set of channels can then be mixed into a stream of channel data. The stream of channel data is transmitted via the communication path to at least one wireless device such that each client associated with a wireless device receives the channel data for their respective channels. The embodiments of the method and apparatus of this invention provide the capability to establish an in-home communication network that allows multiple wireless devices to have independent access to multimedia sources without requiring traditional receiving and/or transmitting equipment associated with independent access to such multimedia sources.

The present invention can be more fully described with reference to FIGS. 1 through 24. FIG. 1 illustrates a multimedia system 10 that includes a multimedia server 12, and a plurality of wireless device 14-22 operably coupled to a plurality of clients 26-34. The multimedia server 12 receives a plurality of channels 36 from various multimedia sources 24. Multimedia sources 24 may be a satellite connection, cable connection, antenna connection for NTSC television broadcast, HDTV broadcast, PAL broadcast, Internet, telephone or other like connection. As one of average skill in the art will appreciate, the multimedia server 12 may be a stand-alone device, or can be incorporated in a satellite receiver, set-top box, cable box, HDTV tuner, home entertainment receiver, or particular computing device or network. In addition, the multimedia server 12 may be implemented using discrete components, integrated circuits, and/or a combination thereof.

The multimedia server 12 wirelessly communicates with wireless devices 14-22. The communication path may be a radio frequency communication path, a wire, an infrared or optical connection, and/or any other means for conveying data. As such, the multimedia server 12 and each of the wireless devices 14-22 include a receiver and/or transmitter operable to convey data via the given type of communication path.

As shown, each wireless device 14-22 is operably coupled to at least one client. For example, wireless device 14 is operably coupled to client 26, which is representative of a personal digital assistant. Wireless device 16 is operably coupled to client 28, which is representative of a personal computer. Wireless device 18 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Wireless device 20 is operably coupled to client 32, which may be a television set, high definition television (HDTV), standard definition television (SDTV), a home theatre system, audio system, et cetera. Wireless device 22 is operably coupled to client 34, which is representative of a laptop or tablet computer. Each wireless device 14-22 may be a separate device from its associated client or can be embedded within the client itself. Additionally, wireless devices 14-22 may be implemented utilizing discrete components, integrated circuits and/or software applications.

Each of the clients 26-34, via its associated wireless device 14-22, is assigned one or more channels from the plurality of channels 36. For example, client 26 may be assigned channel 3 of the plurality of channels for viewing. Accordingly, multimedia server 12 relays the channel selection of channel 3 to wireless device 14. Data corresponding to desired multimedia source 24 is then multiplexed with the data for the other channels and transmitted from multimedia server 12 to each of the wireless devices 14-22. Wireless device 14 monitors the transmission from the multimedia server 12 and extracts the data corresponding to the selected multimedia service. The extracted data is then provided to client 26 for display.

Wireless devices 16, 18, 20 and 22 perform a similar function for their associated clients 28, 32 and 34, respectively. Wireless devices 16-22 provide the multimedia service selection of their respective client 28-34 to multimedia server 12. Multimedia server 12 extracts the multimedia source and multiplexes the data for each of the selected multimedia services into a stream of data assigned to the channels selected for that wireless device. The stream of data is then transmitted to each of the wireless devices. Each wireless device demodulates the appropriate data of the selected channel for its respective client.

From each client device 26-34's perspective, it has independent access to the multimedia source 24. Accordingly, client 26 may change at any time its multimedia source selection from, for example, satellite to Internet or telephone. Wireless device 14 provides the change request to the multimedia server 12, which now establishes an Internet connection for client 26 as opposed to a satellite connection. Similarly, clients 28-34 could also change their selection. Note that if two clients have selected the same multimedia service, multimedia server 12 may only place in the header information on one channel depending on the nature of the multimedia source and the client. As such, client modules 14 and 16 may extract the same data from the transmission by the multimedia server 12 and provide it to their respective clients.

As one of average skill in the art will appreciate, the multimedia system of FIG. 1 provides each client with independent access to the multimedia source 24. As an alternate embodiment, the functionality of client modules 14-22 may vary. For example, wireless device 14 may not provide all the independent functionality that wireless device 16 does. For example, wireless device 14 may not have independent channel selection capabilities, but instead may only be capable of selecting channels that one of the other clients has selected. Alternatively, one client module may service a plurality of clients.

Figure 2:
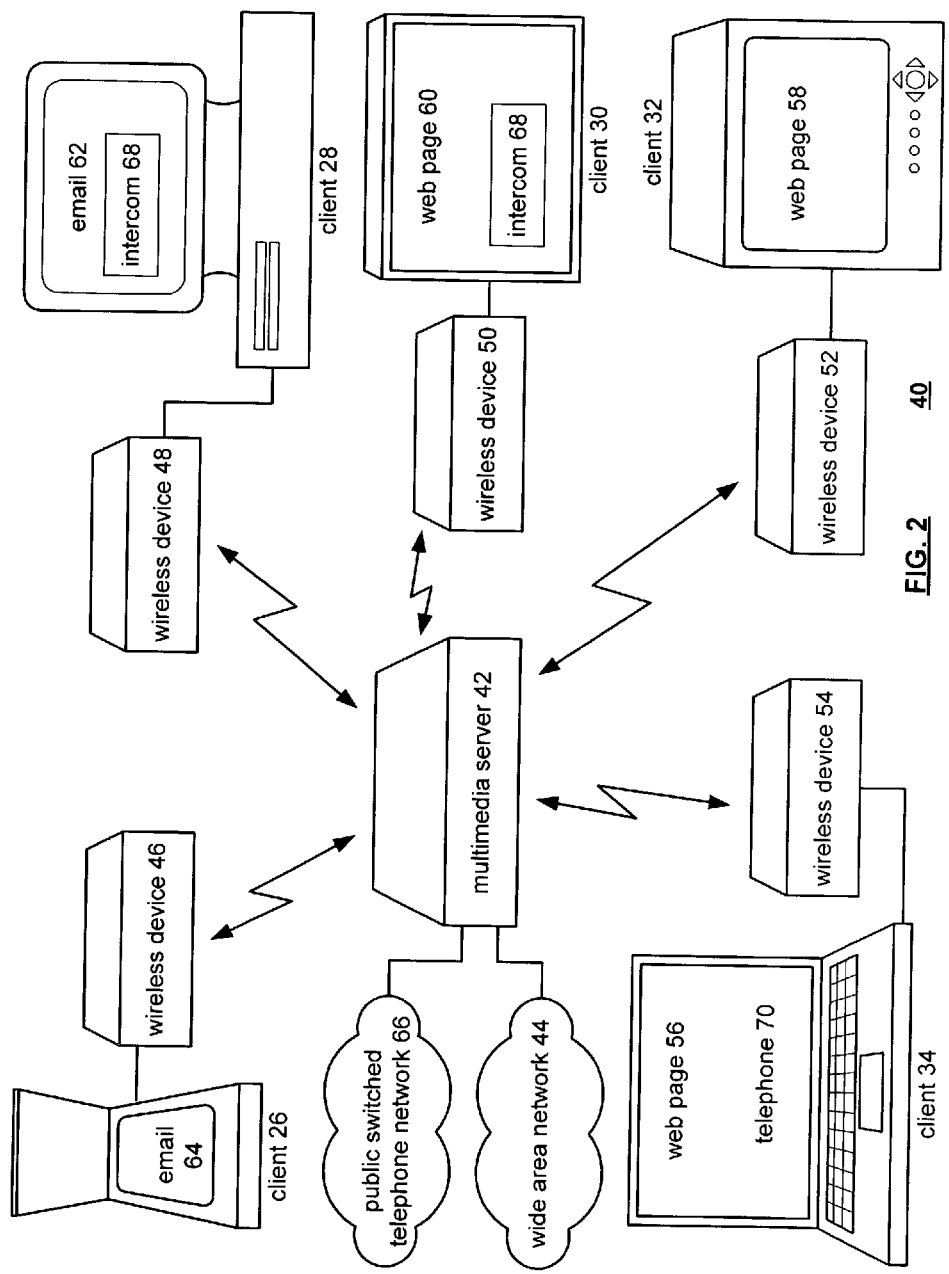
FIG. 2 illustrates a schematic block diagram of another multimedia communication system in accordance with the present invention.

FIG. 2 illustrates a schematic block diagram of a multimedia system 40 that includes a multimedia server 42, a plurality of wireless devices 46-54, and a plurality of clients 26-34. The multimedia server 42 is operably coupled to a wide area network (WAN) 44 and/or to a public switch telephone network (PSTN) 66. The wide area network 44 may be, for example, the Internet. The multimedia server 42 may be a stand-alone device or incorporated within a modem or within one of the clients 26-34. The functionality of multimedia server 42 may be implemented utilizing discrete components and/or integrated circuits with accompanying software.

The plurality of client modules 46-54 communicates with the multimedia server 42 via a communication path. The communication path may be a radio frequency communication path, infrared communication path, and/or wire line communication path. In this system 40, multimedia server 42 is providing independent access for each of the clients 26-34 to the public switch telephone network 66 and/or to wide area network 44.

For access to the public switch telephone network 66, each client 26-34 includes an identification code (e.g., a telephone number). Multimedia server 42 includes cordless telephone functionality such that the multimedia server 42 acts as a base station while each of the wireless devices 46-54 in conjunction with its respective client 26-34 functions as a handset. As such, for typical telephone communications, the multimedia server 42 is a single base station that includes a plurality of handsets, i.e., the clients 26-34 and their associated wireless devices 46-54. Note that if the multimedia server 42 has multiple connections to the public switch telephone network 66, multiple clients may have simultaneous telephone conversations ongoing. In addition, the multimedia server 42 may include private branch exchange (PBX) functionality such that communications between each client may occur within the system. For example, client 26 may communicate with client 34 via the multimedia server 42. Additionally, computing devices within the system may communicate, thus forming a local area network.

To access wide area network 44, multimedia server 42 includes a network connection, which may be a DSL modem, cable modem, 56K modem, ISDN modem, etc. In addition, multimedia server 42 includes a plurality of network access applications (e.g., web browser applications, email applications, et cetera) to facilitate each client's access to the wide area network 44. In operation, wireless devices 46-54, for their respective clients 26-34, provide an indication that their client desires access to the wide area network 44. Upon receiving the wide area network request, the multimedia server 42 opens a network access application (email or web browser) for the respective client based on the request. The multimedia server 42 may have multiple network access applications open for each client 26-34. When this occurs, the multimedia server 42 allocates access to the network connection amongst the clients in a predetermined manner. For example, the multimedia server 42 may utilize a token passing concept to provide access to the network connection for each of the clients.

The multimedia server 42 receives data from the wide area network 44, which is destined for one or more of the clients 26-34. The multimedia server 42 multiplexes the data and provides a single transmission stream to the plurality of wireless devices 46-54. Each of the wireless devices monitors the transmission from the multimedia server 42 to extract data for its respective client 26-34. Upon detecting data for its client, the client module 46 extracts the data and subsequently provides it to its client.

In this illustration, clients 30-34 are accessing the Internet using a web application. For instance, client 34 has web page 56 open, client 32 has web page 58 open, and client 30 has web page 60 open. Each of these web pages appear to the respective client as if the client has direct and independent access to the wide area network. As is also shown, clients 26 and 28 have opened an email application 64 and 62, respectively. As such, clients 26 and 28 may process their email via the multimedia server 42.

Figure 3:
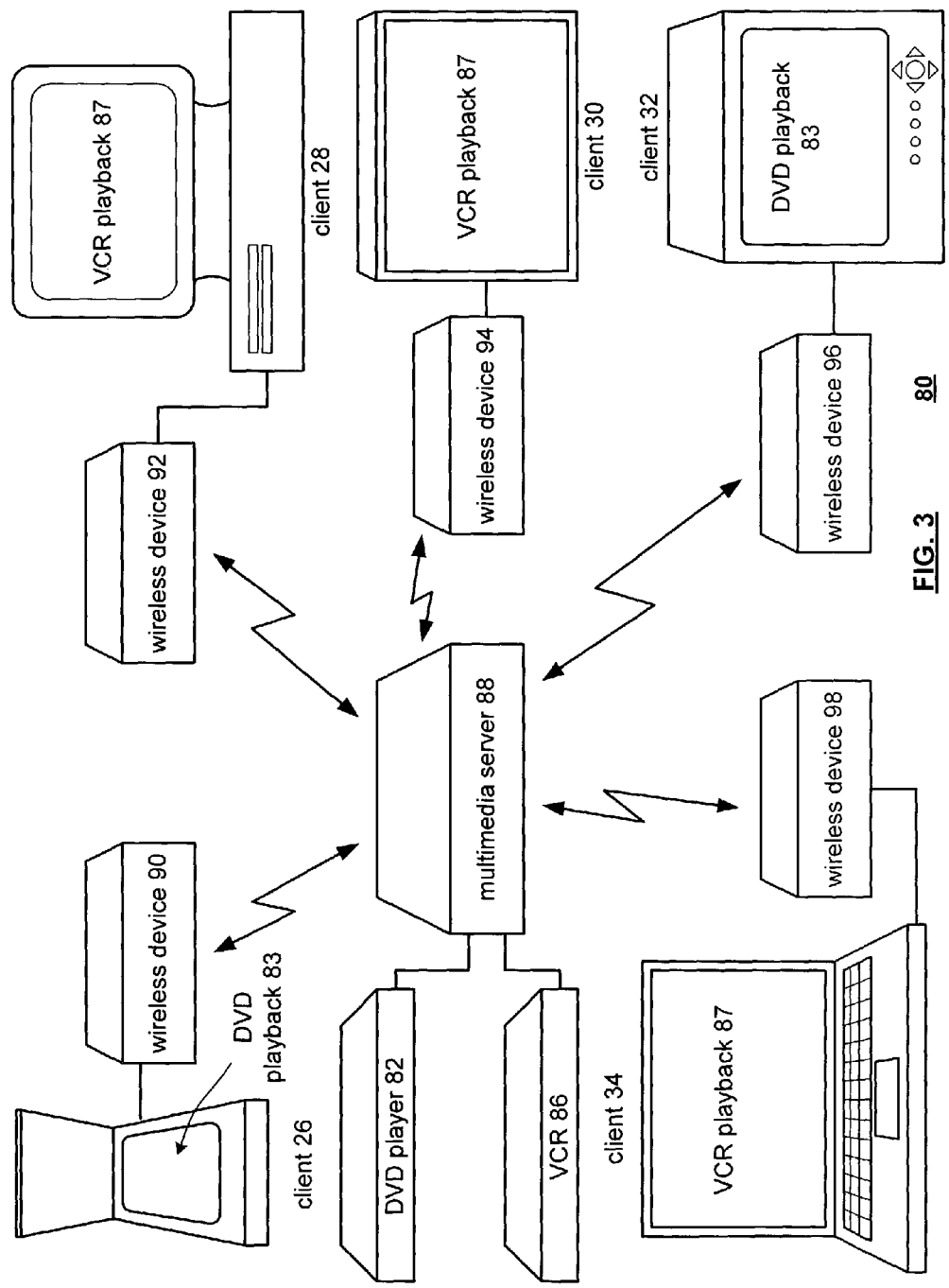
FIG. 3 illustrates a schematic block diagram of a further multimedia communication system in accordance with the present invention.

FIG. 3 illustrates a schematic block diagram of a multimedia system 80 that includes a multimedia server 88, a plurality of wireless devices 90-98, a plurality of clients 26-34, a DVD player 82, a VCR 86, and other such playback devices. Other such playback devices include laser-disk players, digital VCRs, close circuit televisions, camcorders, et cetera. In system 80, the multimedia server 88 provides access to the playback equipment devices, e.g., DVD player 82 and VCR 86, for each of the plurality of clients. Each client may elect to receive a DVD playback, a VCR playback, or playback from any one of the other video sources.

In this illustration, client 26 has selected DVD playback 83. Accordingly, client 26 provides an indication of its selection to wireless device 90. Wireless device 90 communicates client 26's selection to multimedia server 88. Multimedia server 88 processes the selection to provide the playback data to client module 90. As further shown in FIG. 3, client 32 has also selected DVD playback 83, while clients 28, 30 and 34 have selected VCR playback 87. As such, each of the associated client modules 92-98 will provide its clients' selection to the multimedia server 88.

The multimedia server 88 processes the selections to produce a stream of outgoing data. In this example, the stream of outgoing data includes a multiplexing of the DVD playback 83 data and the VCR playback 87 data. Accordingly, the transmission provided by multimedia server 88 to the wireless devices 90-98 identifies which packets and/or frames contain DVD playback data and which frames and/or packets contain VCR playback data. For example, the multimedia server 88 may tag packets as containing DVD playback data or VCR playback data. Alternatively, the multimedia server 88 may tag the packets by including the identity of the particular client module associated with the client that provided the specific VCR or DVD playback request. In either case, the client modules 90-98 interpret the data transmitted from the multimedia server 88 to extract the appropriate data for its client. The extracted data is then provided to its client for playback.

Multimedia server 88 may be operably coupled to the wireless devices 90-98 via an RF connection, infrared connection and/or a wire line connection. In addition, each of the wireless devices 90-98 may be a separate device and/or included within its respective client. As one of average skill in the art will further appreciate, the wireless devices 90-98 may be implemented in discrete circuit components and/or integrated circuits and can further include associated programming operations. Similarly, multimedia server 88 may be a stand-alone device or incorporated within the DVD player 82, VCR 86, and/or any other video source. The multimedia server 88 may be implemented utilizing discrete components, integrated circuits and associated programming operations.

Figure 4:
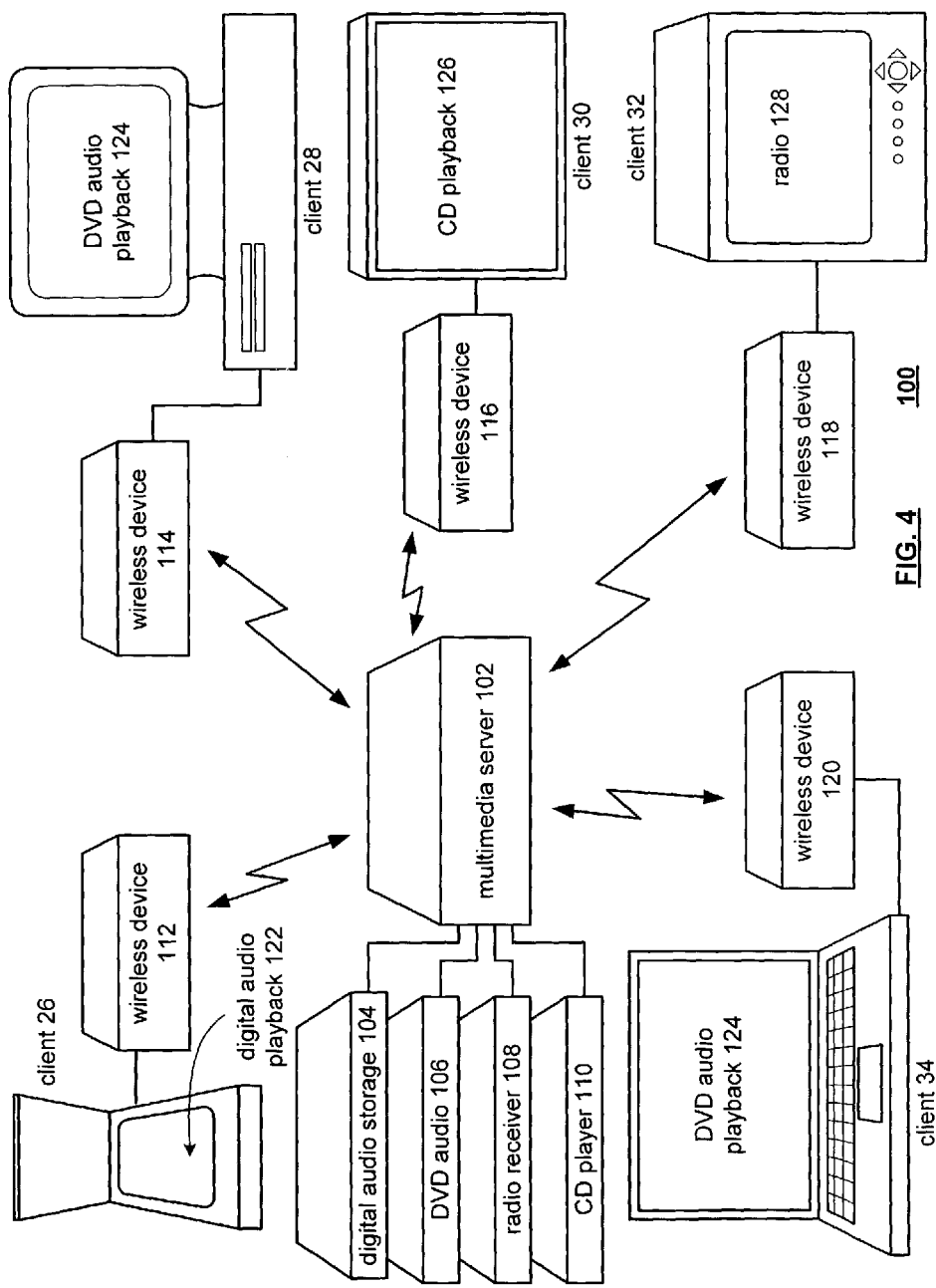
FIG. 4 illustrates a schematic block diagram of yet another multimedia communication system in accordance with the present invention.

FIG. 4 illustrates a schematic block diagram of a multimedia system 100 that includes a multimedia server 102, a plurality of wireless devices 112-120, a plurality of clients 26-34, a digital audio storage device 104, a DVD audio device 106, a radio receiver 108, and a CD player 110. In this illustration, the multimedia system 100 provides a selection of multiple audio sources to a plurality of clients without requiring an independent and direct connection to each of the audio devices.

In operation, the client modules 112-120 receive a selection request from their respective clients. The selection request is selecting audio playback from the digital audio storage device 104, which may be storing MP3 files, digitized audio, et cetera, the DVD audio player 106, the radio receiver 108, the CD player 110, and/or any other type of audio source.

Upon receiving the selection request, the multimedia server 102 processes the request to authenticate it and, once authenticated, retrieves data from the appropriate audio source 104-110. The multimedia server 102 can multiplex the audio data from the audio sources 104-110 into a single transmission or can transmit the audio data along multiple simultaneous channels. Each of the wireless devices 112-120 receives the transmission and extracts the relevant portions for its client.

As shown in FIG. 4, client 26 has selected to display audio from the digital audio storage device 104. Accordingly, the client 26 provides the selection request to wireless device 112, which is subsequently provided to the multimedia server 102. The multimedia server 102 processes the request and initiates the playback from the digital audio storage device 104. The audio playback data from the storage device 104 is received by multimedia server 102, which provides the data, along with the other multimedia data from other sources, to the client modules 26-34. The transmission from the multimedia server 102 may be in packets and/or frames. Each packet and/or frame includes a header section that identifies the source of the data and/or the destination of the data. Accordingly, wireless device 112 monitors its assigned channel for data addressing it and/or identifying the digital audio storage device 104. Upon detecting such data within the transmission, the wireless device 112 extracts the data and provides it to the client 26 for digital audio playback 122.

Client 28 has selected DVD audio playback 124. Accordingly, wireless device 114 provides the selection request to multimedia server 102. Multimedia server 102 initiates the DVD audio playback via the DVD audio device 106. The DVD audio playback is multiplexed with other audio playback data and provided to the client modules 26-34. Wireless device 114 extracts the DVD audio playback data and provides it to client 28. Wireless device 120 provides the same function for client 34.

Wireless device 116 provides a similar function for client 30 but with respect to CD playback 126. Accordingly, client module 116 provides the CD playback request of client 30 to the multimedia server 102. The multimedia server 102 initiates the CD playback via CD player 110 and multiplexes the CD playback data into the transmission stream. Wireless device 116 extracts the CD playback data from the transmission stream and provides it to client 30.

Wireless device 118 provides radio playback 128 connectivity to the multimedia server 102 for client 32. In this example, client 32 provides an indication for radio playback and the desired radio station. Wireless device 118 provides the request to multimedia server 102, which interprets the request and selects one of the plurality of channels received via radio receiver 108. The data from the selected radio channel is multiplexed with the other audio data being processed by the multimedia server 102. Wireless device 118 extracts the appropriate radio audio data from the transmission and provides it to client 32.

Figure 5:
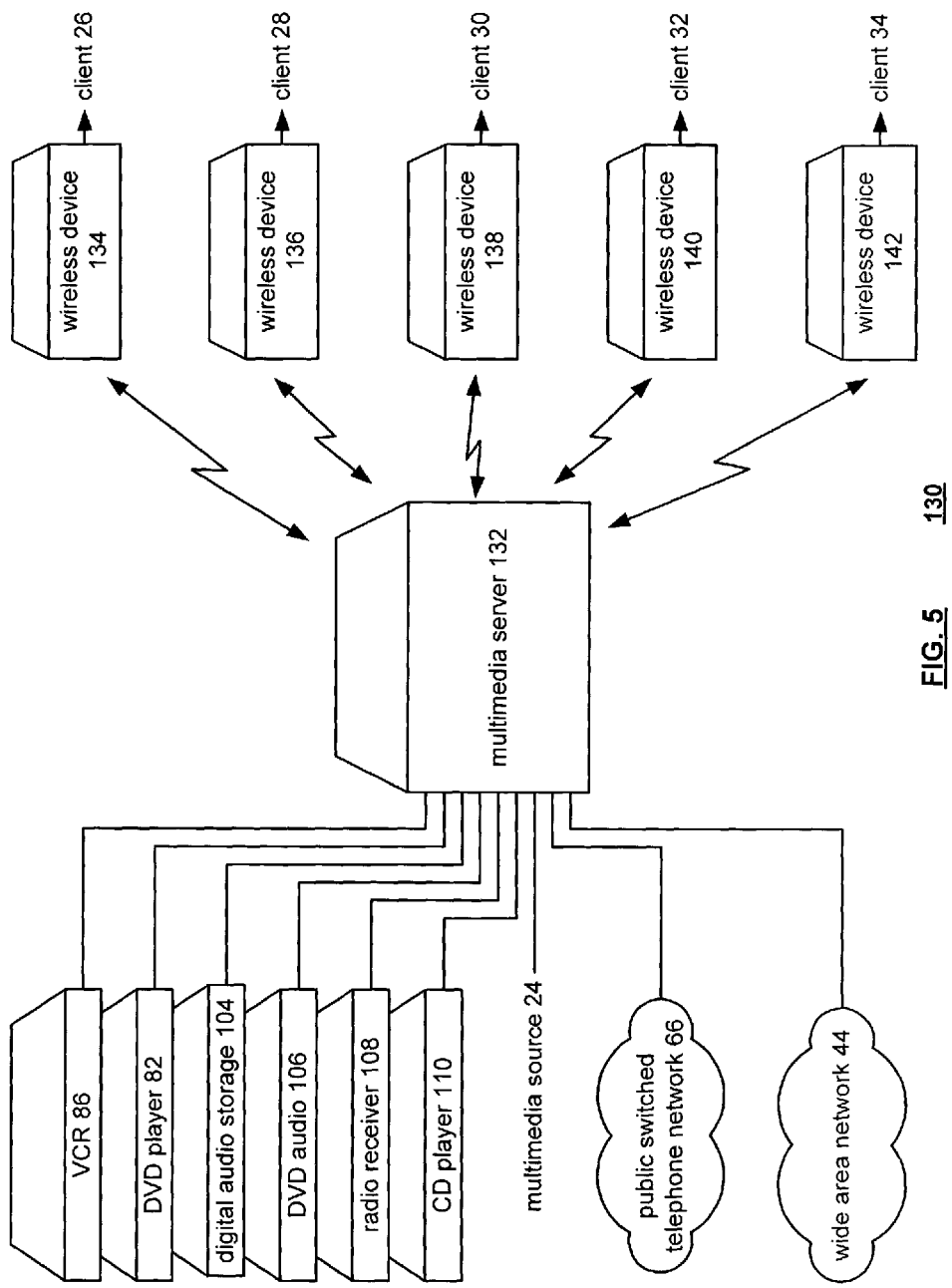
FIG. 5 illustrates a schematic block diagram of a still further multimedia communication system in accordance with the present invention.

FIG. 5 illustrates a schematic block diagram of a multimedia system 130 that includes multimedia server 132, wireless devices 134-142, clients 26-34, and a plurality of multimedia sources. The multimedia sources include VCR 86, DVD player 82, digital audio storage device 104, DVD audio 106, radio receiver 108, CD player 110, multimedia source 24, public switch telephone network 66, wide area network 44, and/or any other type of data, audio, and/or video source. In this system 130, the clients 26-34 may select playback from, and/or connection to, any one of the multimedia sources. The selection request from each client module would identify the desired multimedia source, the client, the desired service and any other information to assist the multimedia server 132 in processing the request. As such, one client may be accessing the Internet, while another client is watching a satellite broadcast channel, while another is listening to a CD playback, while another is talking on the telephone, and yet another is watching a DVD playback. This is all done via the multimedia server 132 without requiring the clients to have direct access to the multimedia sources and without the requirement that each client have its own multimedia source and/or multimedia source connection. In essence, multimedia server 132 provides the functionality of one or more of multimedia server 12, 42, 88 and 102 of FIGS. 1-4. Wireless devices 134-142 provide the functionality of one or more of the wireless devices described generally with reference to FIGS. 1-4.

As one of average skill in the art will appreciate, the multimedia server 12, 42, 88, 102, and/or 132 may be incorporated in a home theatre receiver, television set, modem, set-top box, cable receiver, satellite receiver, VCR, DVD player, et cetera to provide the networking functionality as generally described in FIGS. 1-5. As one of average skill in the art will further appreciate, the clients 26-34 of FIGS. 1-5 may be any one of a personal computer, a laptop computer, a personal digital system, a video telephone, a digital telephone, a cellular telephone, a monitor, a television, a high definition television, a printer, a facsimile machine, and/or any devices that includes an audio and/or video display.

Figure 6:
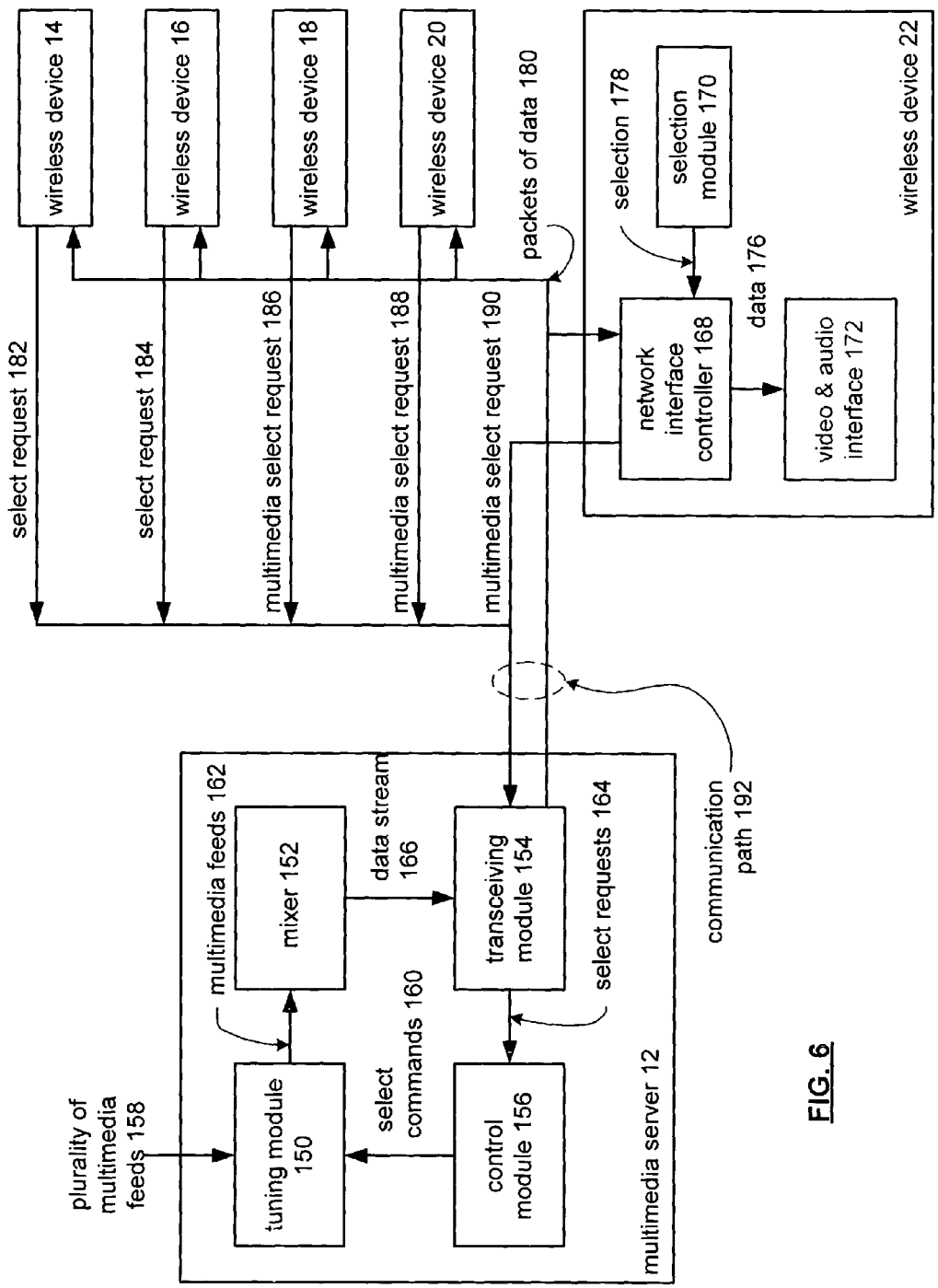
FIG. 6 illustrates a schematic block diagram of a multimedia server and client modules of the multimedia communication system illustrated in FIG. 1.

FIG. 6 illustrates a schematic block diagram of the multimedia server 12 and wireless devices 14-22 of system 10 shown in FIG. 1. Multimedia server 12 includes a tuning module 150, a channel mixer 152, a transceiving module 154, and a control module 156. The multimedia server 12 is operably coupled to each of the wireless devices 14-22 via a communication path 192. The communication path 192 may be a wire line connection, a transmit wire line connection, a receive wire line connection, a transceiving radio frequency path, a transmit radio frequency path, a receive radio frequency path, a transceiving infrared path, a transmitting infrared path, and/or a receiving infrared path.

Each of the wireless devices 14-22 includes a network interface controller 168, a selection module 170, and a video and/or audio interface 172. The selection module 170 is operably coupled to receive an input from the client to produce a multimedia source selection 178. Accordingly, if the client is a television set, the television set provides a signal to the selection module 170 indicating the multimedia source and channel selected. Alternately, the multimedia source selection module 170 may include a remote control receiver such that when the remote control of the television is used to change the channel displayed at the television set, selection module 170 receives the control signal, interprets it, and produces the multimedia source selection 178 therefrom. The network interface controller 168 receives multimedia source selection 178 and prepares it for transmission via the communication path 192 to the multimedia server 12. The processing performed by the network interface controller 168 is dependent on the type of communication path 192.

The network interface controller 168 provides the process multimedia source selection 178 as a multimedia select request 190 to the transceiving module 154 of multimedia server 12. As one of average skill in the art will appreciate, wireless devices 14-20 perform a similar function as wireless device 22 in producing their respective multimedia select requests 182-188. As one of average skill in the art will appreciate, the multimedia source selection 178 may include selecting an audio channel, video channel, a particular audio source (e.g., CD playback), a particular video source (e.g., DVD player), etc. In addition, the multimedia select requests 182-190 may further include volume adjust, picture quality settings and adjustments, displaying restrictions, purchase request, picture-in-picture activation and deactivation, picture-in-picture channel select, video pausing, reverse play, fast forward, and/or audio muting.

The transceiving module 154 receives the multimedia select requests 182-190 from the plurality of client modules 14-22 via communication path 192. The transceiving module 154 extracts the physical layer information from the multimedia select requests 182-190 to retrieve the respective multimedia source select request 164. The transceiving module 154 provides multimedia source select request 164 to control module 156. As an analogy, note that the multimedia source selections 178 may correspond to network layer data while the multimedia select requests 182-190 may correspond to physical layer data of a ISO standardized communication system. As such, a channel selection request utilizes physical layer type identification within its header and includes in its data section the multimedia source selections 178. The channel selections include a header section and data section corresponding to the particular channel selected.

The control module 156 processes the channel select request 164. The processing of the channel select request 164 includes authenticating the request and preparing a set of multimedia selection commands 160 therefrom. The tuning module 150 receives the set of multimedia selection commands 160 and extracts a set of multimedia feeds 162 from a plurality of multimedia feeds 158 based on the set of selection commands 160. The plurality of multimedia feeds 158 correspond to channels provided via a satellite connection, a cable connection, an NTSC broadcast, an HDTV broadcast, a PAL broadcast, et cetera. The tuning module 150 provides data for each of the multimedia feeds 158 to mixer 152.

Mixer 152 mixes (i.e., multiplexes) the set of multimedia feeds 162 to produce a stream of data 166. The mixing of the set of channels includes converting the data of each multimedia feed into a generic data type and then converting the generic data into a specific data format for transmission as data stream 166. The transceiving module 154 may transmit data stream 166 as data packets 180. Alternatively, data stream 166 may be transmitted in frames. Alternatively, each data stream may be sent via a channel to an individual wireless device. Each wireless device 14-22 receives the packets, or frames, of channel data 180 via its network interface controller 168.

Network interface controller 168 within each wireless device 14-22 may interpret the header of each data packet 180 to determine whether it addresses its corresponding wireless device. If so, the network interface controller 168 removes the physical layer portion of data packet 180 to retrieve data 176. Data 176 is provided to the appropriate user interface. Here data 176 is provided to video and/or audio interface 172. For example, if data 176 is video data, interface 172 is a video interface to a display input of the associated client. Alternatively, if data 176 is audio data, interface 172 is an audio interface that couples to an audio input of the associated client.

Figure 7:
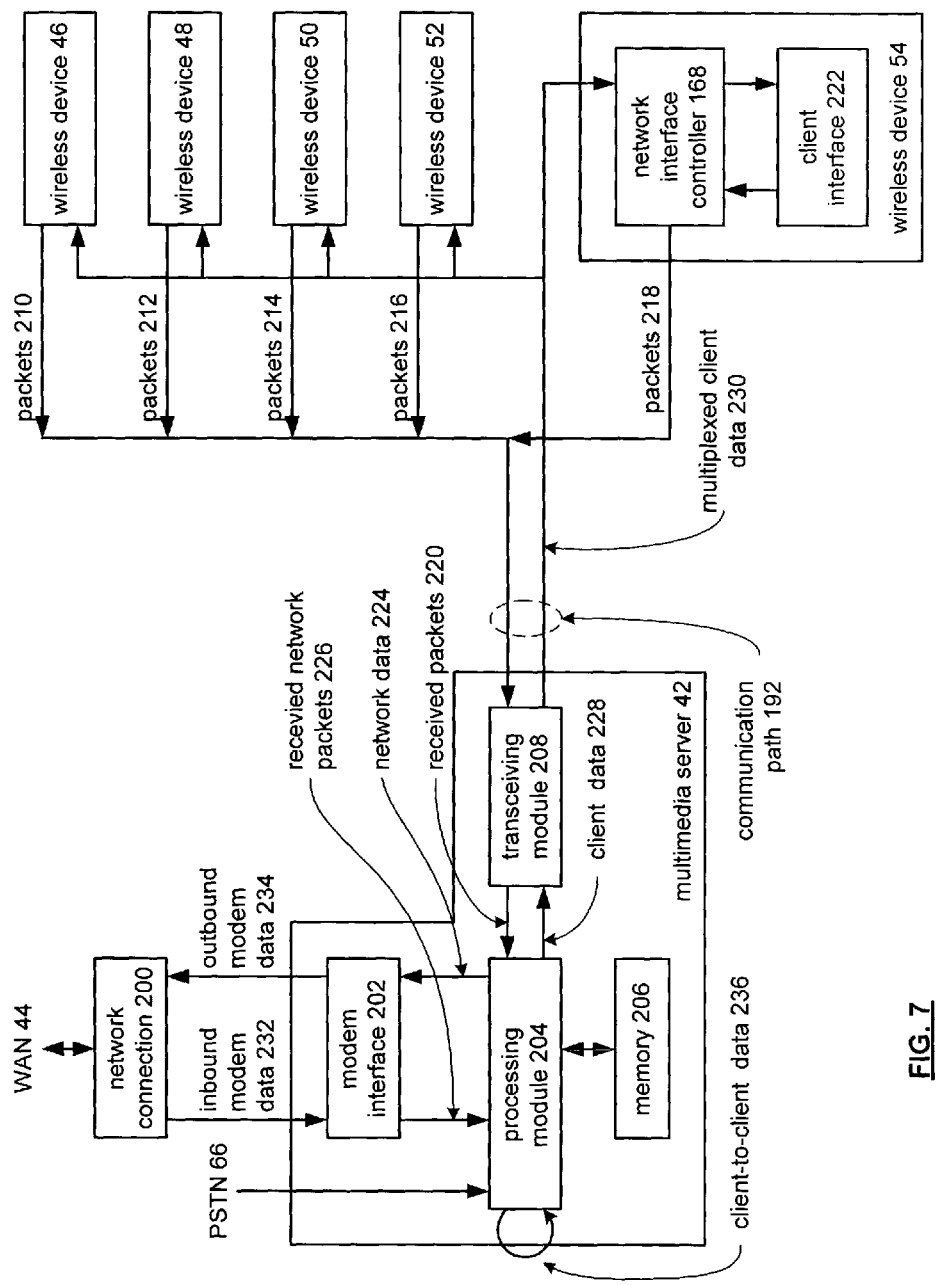
FIG. 7 illustrates a schematic block diagram of a multimedia server and client modules of the multimedia communication system of FIG. 1.

FIG. 7 illustrates a schematic block diagram of multimedia server 42 and wireless devices 46-54 of the multimedia system 40 of FIG. 2. The multimedia server 42 includes a modem interface 202, a processing module 204, memory 206 and a transceiving module 208. The modem interface 202 is operably coupled to a network connection 200, which in turn is operably coupled to a wide area network 44. The processing module 204 is also coupled to the public switch telephone network 66.

Wireless devices 46-54 each include a network interface controller 168 and a client interface 222. In operation, the wireless device 46-54, via its client interface 222, receives a request that indicates the client's desire for either Internet connection via wide area network 44, to place a telephone call via the PSTN 66, for client-to-client communication, or for multimedia sources as discussed in FIGS. 1-6. Client interface 222 provides connectivity to the client via a PCI bus interface, an AC 97 bus interface, a parallel input, a serial input, et cetera. The network interface controller 168 processes the request from its client to produce a request packet(s), which is/are transmitted to the transceiving module 208 of the multimedia server 42.

The transceiving module 208 retrieves the request from the packet(s) in accordance with the data conveyance protocol used by the multimedia system. The transceiving module provides the retrieved requests to the processing module 204. Processing module 204 determines whether the request is valid. If so, the processing module 204 sets up the appropriate interface with the PSTN 66 and/or the WAN 44. The appropriate interfacing to the PSTN for a telephone connection includes the processing module 204 performing base station like functions of a cordless telephone, while the client module and/or client functions as a cordless handset. As a base station, the processing module 204 initiates a connection with the PSTN 66 to enable a telephone communication for the requesting client.

If the request was for Internet access via wide area network 44, the appropriate interfacing includes the processing module activating a network access application for the requesting client. The network access application may be a web browser application, email application, et cetera. The particular network access application will be dependent upon the request provided by the client. Upon activating the network access application, the processing module determines whether the network connection 200 is actively coupled to the wide area network 44. If not, the processing module 204 establishes, via the modem interface 202, a connection to wide area network 44 through the network connection 200. At this point, the respective client has access to the Internet.

With the Internet access established, the client interface 222 receives Internet data from the client and provides it to the network interface controller 168. The Internet data includes inputs from the client in response to the particular network access application (e.g., web browser, email, etc.). For example, the inputs for an email application include send a message, read a message, compose a message, etc. The corresponding processing of these inputs by multimedia server, via the network access application, is provided back to the client for display by the client. As such, from the client's prospective, the client has direct access to the Internet.

The client generates the inputs via a keyboard, touchscreen, and/or other input device and provides them to the wireless device via the client interface 222. The client interface 222 provides the inputs to the network interface controller 168, which packetizes them to produce packets 218. The packets 218 include a header section and data section. The header section includes the identity of the client module and/or client, the destination address, and other physical layer-type header information. The data section includes the input data provided by the client. Each wireless device 46-54 produces packets 210-218 in a similar manner.

The network interface controller 168 provides the packets 210-218 to the transceiving module 208 of the multimedia server 42 via the communication path 192. Since Internet access is typically a bi-directional communication, the communication path 192 may include a separate transmit path and a separate receive path. The transmit path may be used for transmitting packets 210-218 to the multimedia server while the receiving path may be used to receive multiplexed client data 230 from the multimedia server 42. Additionally, each wireless device may interface with transceiving module 208 via an assigned logical or physical channel. Assigning clients to the physical or logical channels requires determining the bandwidth capacity and need for each client, and determining the packet size for each client with the goal of maximizing the throughput to each client relative to the throughput required to obtain satisfactory transmission quality.

The transceiving module 208 has the ability to transmit on multiple channels simultaneously from the multimedia server 42 to wireless devices 46-54. The uplink direction uses a single channel. This configuration is advantageous for video delivery because video requires a much higher bandwidth in the downlink than the uplink. Uplink traffic consists of access devices (DCF), transfer acknowledgements (ACKS) and source messaging from clients to the multimedia server. ACKS allow the receiving client to indicate to the source that a packet was received without error. If a packet is received in error or missed all together, no ACK will be sent and the server retransmits the packet in a process known as automatic repeat request (ARQ). At reasonable packet error rates, ARQ can be used to reduce the effective packet error rate (PER) to near zero. In the 802.11a standard, an ACK is transmitted at a fixed interval after the end of packet reception. This duration between the end of packet reception and the start of the transmission of an ACK is referred to as "Tsifs" and is 16 usecs (4 frames) long in IEEE 802.11a. This standard operation is depicted in FIG. 8A.

Because an ACK is transmitted on the uplink, when two channels are transmitted simultaneously on the downlink a problem arises. If both packets are the same length, clients will attempt to transmit an ACK on the same channel at the same time. If the packets differ in length, an ACK may be transmitted while the server is still transmitting. The server cannot receive while transmitting and would therefore miss the ACK. To avoid this situation, the downlink transfers include a proprietary field in the data stream that specifies a fixed delay for each ACK. This allows the ACK from one of the channels to be delayed such that it will occur Tsifs after the end of the first ACK. While this adds some overhead, the overhead is small compared to the gain of the second channel. This configuration is shown in FIGS. 8B and 8C.

FIG. 8A depicts the operation of a single channel device. Here the clients transmit serially. The overhead for each client consists of 2 Tsifs, a Tack, a Tsync and a Tmac. The operation of a dual channel system is illustrated in FIG. 8B. The second channel not only allows the transmission of client 1 in parallel with client 0, but also requires only an additional Tsifs and Tack, effectively reducing the overhead. FIG. 8C illustrates how two short duty cycle clients can be transmitted in parallel with one long duty cycle client in a dual channel system. The second channel prevents one high duty cycle client from effectively occupying the entire available bandwidth.

At a higher level, the media access controller ("MAC") breaks up the channel into two access mechanisms, point coordination function (PCF) and distributed coordination function (DCF). During the PCF period, all transactions are coordinated from gateway. Because of this central coordination, there is no contention for the channel and no associated overhead. This allows continuous data streams, such as continuous video streams, to be transmitted in a nearly asynchronous manner without overhead for contention and is therefore very efficient for continuous data streams. The DCF period allows random access to the channel for devices, which do not have continuous data streams, such as many Web based applications. For this type of data transmission, the overhead for contention-based access is preferred because data is rarely transmitted, but bandwidth requirements can be high when data is needed. The PCF and DCF transfers are alternated at a fixed rate. The rate is variable, but is presently envisioned to be approximately 1 second. The percentage of this period occupied by the PCF and DCF transmissions is variable and can be changed dynamically based on the types of clients and available channel throughputs. It is presently envisioned that the PCF period will be much larger than the DCF period.

Figure 9:
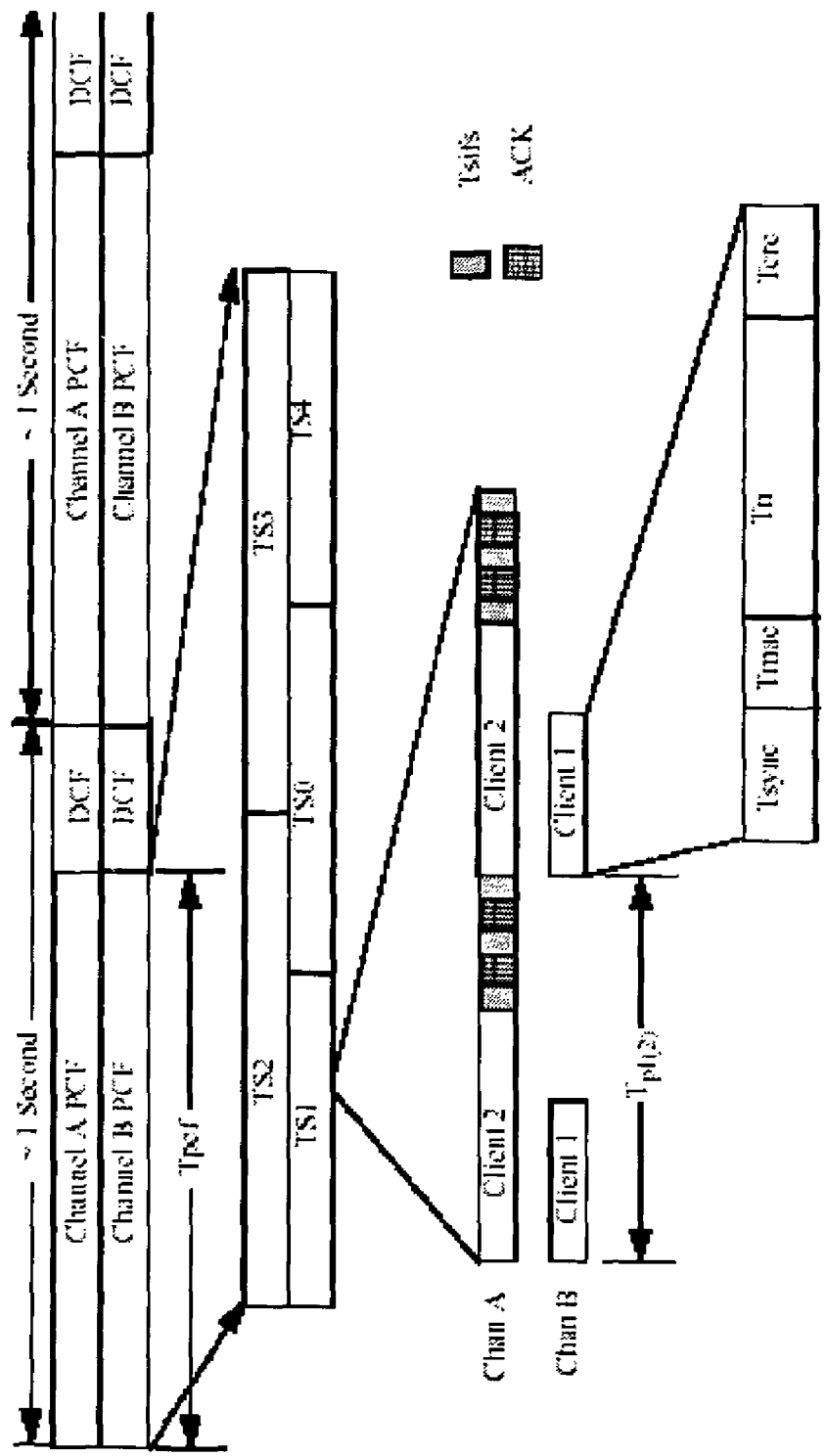
FIG. 9 shows an overview of one transmitted signal format utilized within the present invention.

The multimedia server can divide channels A and B into timeslots during the PCF period. There is one timeslot for each client. The data rate to a particular client is therefore determined by the percentage of the channel devoted to PCF, the percentage of the PCF period given to that client's timeslot, and the efficiency of the actual transfer. The last item is effectuated by the percentage of time given to packet overhead as well as any idle time on the channel. FIG. 9 shows an overview of the transmitted signal format.

FIG. 9 depicts a channel divided into two sections based on access type, the PCF and DCF periods. The PCF period is further divided into timeslots. During a given timeslot, data is transmitted to one client. The timeslots may or may not line up on channels A and B. Each timeslot is made up of several packets. Note that differences in packet lengths on channels A and B result in dead time on one or the other channel. Each packet can further be broken down into a sync period that contains both the sync fields and signal fields, the MAC header, the payload period Tn and the CRC (cyclic redundancy code).

As shown in FIG. 9, the actual data rate delivered to a given client will be considerably less than the data rate of the channel. Consider a client n, where the physical channel rate is given by $C_n$. The actual data rate, $r_n$, delivered to the client is given by:

$$r_n = C_n * (T_n/T_{pm}) * (TS_n/T_{pcf}) * (T_{pcf}/Tr) \qquad \text{Equation (1)}$$

Notice that two key terms affect throughput. The first is the length of the packet payload relative to the repetition time of the packet, and the second is the percentage of the time that the transmitter dedicates to the timeslot for client n. The first term $(T_n/T_{pm})$, is essentially the overhead. This term is always less than 1. In general, it is maximized by making the payload in each packet larger. This causes $T_n$ to increase. Note that $T_{pm}$ consists of two terms, $T_n$ and a fixed overhead $W_n$. This allows Equation 1 to be rewritten as:

$$r_n = C_n * (T_n/(T_n + W_n)) * (TS_n/T_{pcf}) \qquad \text{Equation (2)}$$

In this format, it is clear that as $T_n \gg W_n$, the first term will approach 1. Unfortunately, there are limits to increasing $T_n$.

As $T_n$ becomes large, the probability of packet error also increases. At some point, the retransmission rate becomes high enough to offset the increased MAC efficiency and the throughput will begin to drop. In addition, the IEEE 802.11a standard limits packets to 4096 bytes.

The second term is the duty cycle of the time slot. This can be changed to directly affect the throughput to client n. However, increasing the duty cycle to client n necessitates decreasing the duty cycle to other clients. It seems reasonable that the algorithm to choose the duty cycles to each client must be fair to all clients. The performance of these algorithms will be discussed in the description of FIGS. 18-22.

Returning to FIG. 7, the transceiving module 208 receives packets 210-218 and removes the physical layer header information to produce retrieved requests 220. The retrieved requests 220 are provided to processing module 204, which converts them into network data 224 by executing the network access application thereon. Note that the network data 224 includes separate data for each of the clients accessing the WAN 44. The processing module 204 provides the network data 224 to the network connection 200, via the modem interface 202, as outbound modem data 234. Responses to the outbound modem data 234 are received via the network connection 200 as inbound modem data 232. The processing module 204 receives the inbound modem data 232 as received network packets 226 via the modem interface 202.

The processing module 204 interprets the received network packets 224 to identify the source and/or destination of the network packets. For each network packet that is destined for a particular client, the processing module adds header information to address the particular client, thereby producing client data 228. The transceiving nodule 208 performs the physical layer interfacing on the client data 228 to produce multiplexed client data 230.

Each of the wireless modules 46-54 may receive multiplexed client data 230 via the communication path 192. The network interface controller 168 in each wireless device 46-54 monitors the multiplexed client data 230 to identify packets destined for its respective client. For each packet the network interface controller 168 identifies for the corresponding client module, it strips off the physical layer information and provides the respective client data to the client interface 222. The client interface 222 provides the respective client data to the client, thereby facilitating Internet access for the particular client.

The multimedia server 42 may also provide intercom, or client-to-client, communications between the clients of the system 40. In this instance, the client interface 222 would receive a request for intercom communications from its client. The network interface controller 168 would packetize this request and provide it to the transceiving module 208 of multimedia server 42. The processing module 204 processes the request and determines whether the request can be fulfilled. Whether the request can be fulfilled is based on resource availability of the multimedia server, bandwidth availability of the communication path 192, and functionality capabilities of the clients involved in the intercom communication. If the request can be fulfilled, the processing module 204 provides a response to the initiating wireless device.

Once the intercom communication has been established, the initiating client provides data to the multimedia server 42 via the network interface controller 168 in packets. The packets include a header section and a data section, wherein the header section indicates that the data section includes client-to-client data. Once the processing module 204 receives the packetized intercom data, the processing module 204 detects that this is a client-to-client communication and processes the client-to-client data 236. The processing module 204 provides the client-to-client data 236 as part of the client data 228. The client data 228 includes header information that identifies it as a client-to-client communication data (audio or video), telecom data, and/or Internet communication data.

The transceiving module 208 performs the physical layer packetizing of the client data 228 to produce the multiplexed client data 230. The targeted client module identifies the packets containing the client-to-client communication via the network interface controller 168, which strips off the physical layer portion of the packets and provides the client-to-client data to the client interface 222. The client interface 222 provides the intercom data to the respective client.

Figure 10:
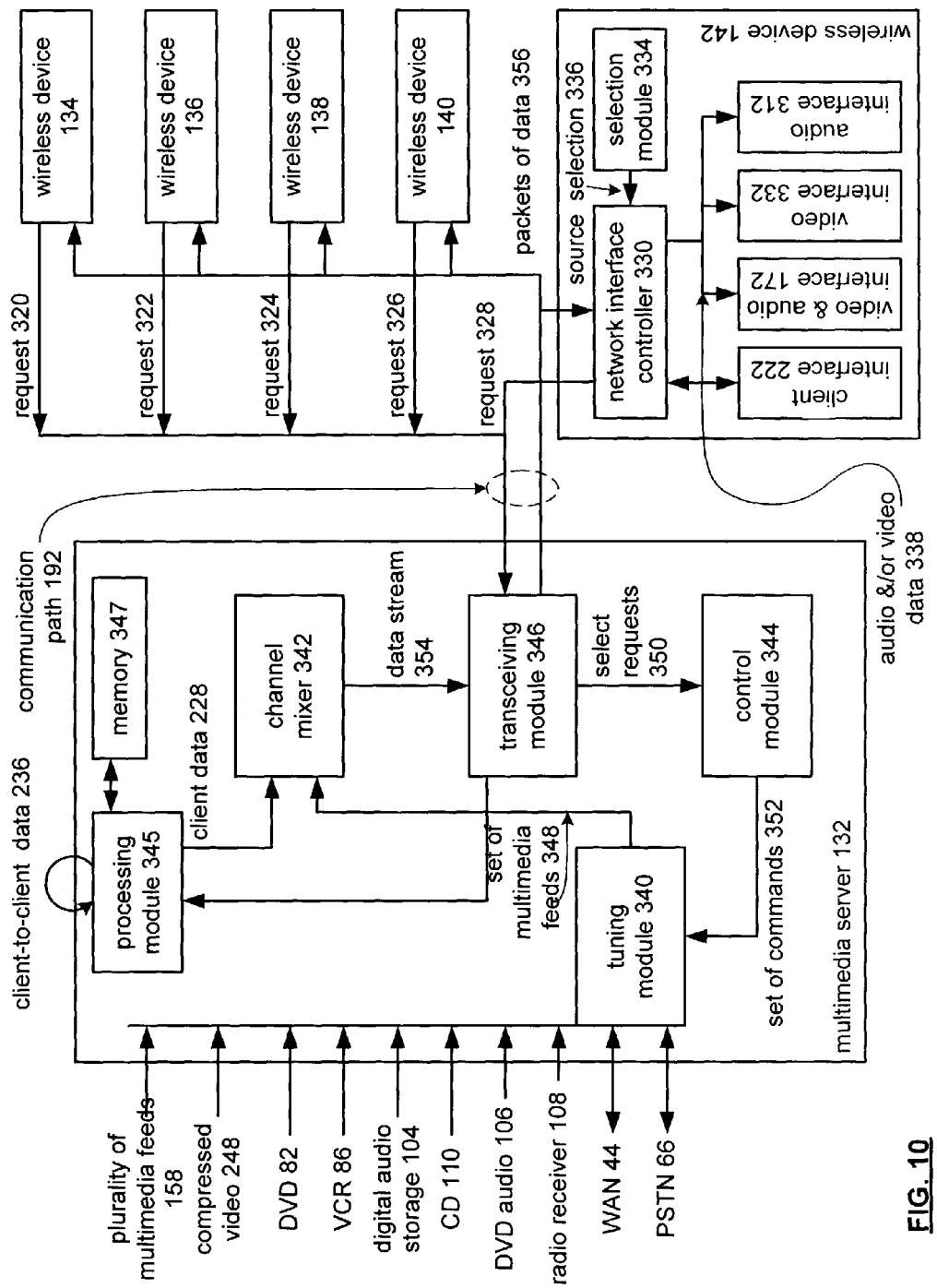
FIG. 10 illustrates a schematic block diagram of a multimedia server and client modules of the multimedia communication system of FIG. 4.

FIG. 10 illustrates a schematic block diagram of multimedia server 132 and wireless devices 134-142 of the multimedia communication system 130 of FIG. 5. The multimedia server 132 includes processing module 345, memory 347, channel mixer 342, transceiving module 346, control module 344, and tuning module 340. Each of the wireless devices 134-142 includes a selection module 334, network interface controller 330, client interface 222, video and audio interface 172, video interface 332, and an audio interface 312.

In this multimedia communication system 130, a client may select any one of a variety of multimedia services including client-to-client communications, viewing a channel from a satellite connection, cable connection, etc., viewing closed circuit television, viewing compressed video stored in memory, viewing a DVD, viewing a cassette from a VCR, listening to digital audio, listening to a compact disk, listening to DVD audio, listening to a radio station, accessing the Internet, and/or participating in a telephone call.

To initiate one or more of these multimedia services, the selection module 334 of a wireless device 134-142 receives an input, either from the client device or from a remote control device associated with the client device. The input identifies the particular client as well as identifying the particular service desired. The selection module 334 interprets the input to produce a source selection 336. The selection module 334 provides the source selection 336 to the network interface controller 330.

The network interface controller 330 prepares the source selection 336 for transmission to the multimedia server 132. The preparation may be done by packetizing the source selection 336 for a physical layer type transmission, placing at least a portion of the source selection 336 in an allocated timeslot in a TDM transmission scheme, responding to a polling request from the multimedia server 132, requesting and/or receiving a token ring, et cetera. Regardless of the type of access scheme used, the network interface controller 330 produces a request 320-328, which is transmitted to the transceiving module 346 of multimedia server 132.

The transceiving module 346 receives the request 320-328 from the wireless devices 134-142. The transceiving module 346 processes the request in accordance with the transmission scheme utilized. For example, if the transmission scheme is carrier sense multiple access, the transceiving module 346 interprets the header to identify the particular client such that it may isolate the individual request 320-328. As a further example, if TDM access is utilized, the transceiving module 346 identifies the particular timeslot allocated to each client module to identify the corresponding request 320-328. Regardless of the type of transmission scheme utilized, the transceiving module 346 removes the physical layer type overhead from the requests 320-328 to recapture the source selections 336. The source selections 336 are provided as select requests 350 to the control module 344.

The transceiving module 346 processes requests 320-328 to identify the particular type of selection being requested. If the selection is to access one of the multimedia sources, it processes the selection as described above. If, however, the transceiving module 346 determines that one or more of the requests 320-328 are requesting client-to-client communication, the transceiving module 346 generates a client-to-client request, which is provided to processing module 345.

The control module 344 interprets each of the select requests 350 in accordance with the access privileges and authentication processes for each of the wireless devices 134-142. If the selection request is valid and the wireless device 134-142 has been authenticated, the control module 334 generates a select command for each corresponding request 320-328. The control module 334 provides the select commands as a set of commands 352 to the tuning module 340.

The tuning module 340 processes each of the select commands of the set of commands 352 to identify the multimedia source to be accessed. For each command received, the tuning module 340 selects the appropriate channel of the multimedia sources. For multimedia sources that include a plurality of available channels or feeds, such as a satellite connection, cable connection, radio receiver, et cetera, the tuning module 340 selects the particular source and further selects one of the plurality of feeds from the multimedia source. The resulting isolated multimedia feeds are provided to mixer 342 as a set of multimedia feeds 348.

Processing module 345 receives client-to-client communication requests and processes the requests to produce client-to-client data 236. Processing module 345 provides the client-to-client data 236 as client data 228 to mixer 342. Mixer 342 processes the set of multimedia feeds 348 and, when included, client data 228. Mixer 342 converts the data of each feed of the set of channels 348 into generic data. Client data 228 is multiplexed with generic data to produce data stream 354. Mixer 342 provides data stream 354 to transceiving module 346.

The transceiving module 346 transmits the data stream 354 in accordance with the data transmission protocol incorporated by the multimedia communication system. As such, the data stream is a framed, packetized, et cetera, to produce packet of data 356 that are provided via a communication path 192 to wireless devices 134-142.

The network interface controller 330 within each wireless device 134-142 receives the packets of data 356 and interprets header information to determine whether a particular packet is intended for the corresponding client module. If so, the network interface controller 330 strips off the header information and further interprets the particular type of data contained in the packet. This may be done by reading additional header information to identify the particular sources of information and/or accessing memory, which corresponds the anticipated packets with the source selection 336. If the packets correspond to data received from one of the multimedia sources, the network interface controller 330 provides audio and/or video data 338 to one or more of the interfaces 172, 332 or 312. If, however, the data relates to a client-to-client communication, to a telephone call or to accessing the Internet, the network interface controller 330 provides the received data to the client interface 222.

Each of the interfaces 172, 222, 332, and 312 communicates with the respective client device either through external ports of the client device, such as a serial port or parallel port, or through internal access via a PCI bus, AC 97 bus, et cetera. Once the data is received by the client device, it is displayed visually and/or audibly as if the client device had direct access to the particular multimedia source being accessed.

As one of average skill in the art will appreciate, the mixing of data performed by mixer 342 may utilize a prioritization scheme depending on the type of data being mixed. For example, if the data being mixed includes real time audio and/or video data, such data may take priority over non-real time video and/or audio. Such real time video and/or audio can include telephone communications, watching live broadcasts, et cetera, while non-real time video and/or audio can include viewing a DVD, VCR, listening to digital audio, CD, DVD audio, et cetera. The non-real time data may be transmitted in large bursts with greater time intervals between the bursts and still provide a continuous flow of display data. Conversely, real time data is transmitted more frequently and in smaller bursts.

As one of average skill in the art will further appreciate, the memory 347 of multimedia server 132, or other memories in any of the multimedia servers shown, may enable the multimedia server 132 to function as a digital video recorder. As such, live broadcasts may be captured from a satellite connection, cable connection, NTSC broadcast, PAL broadcast, and/or HDTV broadcast and stored in memory for subsequent playback. Further, multimedia server 132 may couple to one or more of the multimedia sources shown. As such, multimedia server 132 may include the functionality of any one or all of the multimedia servers shown in FIGS. 1-5. Correspondingly, each wireless device 134-142 may include the functionality of one or more of the wireless devices shown in FIGS. 1-5.

Figure 11:
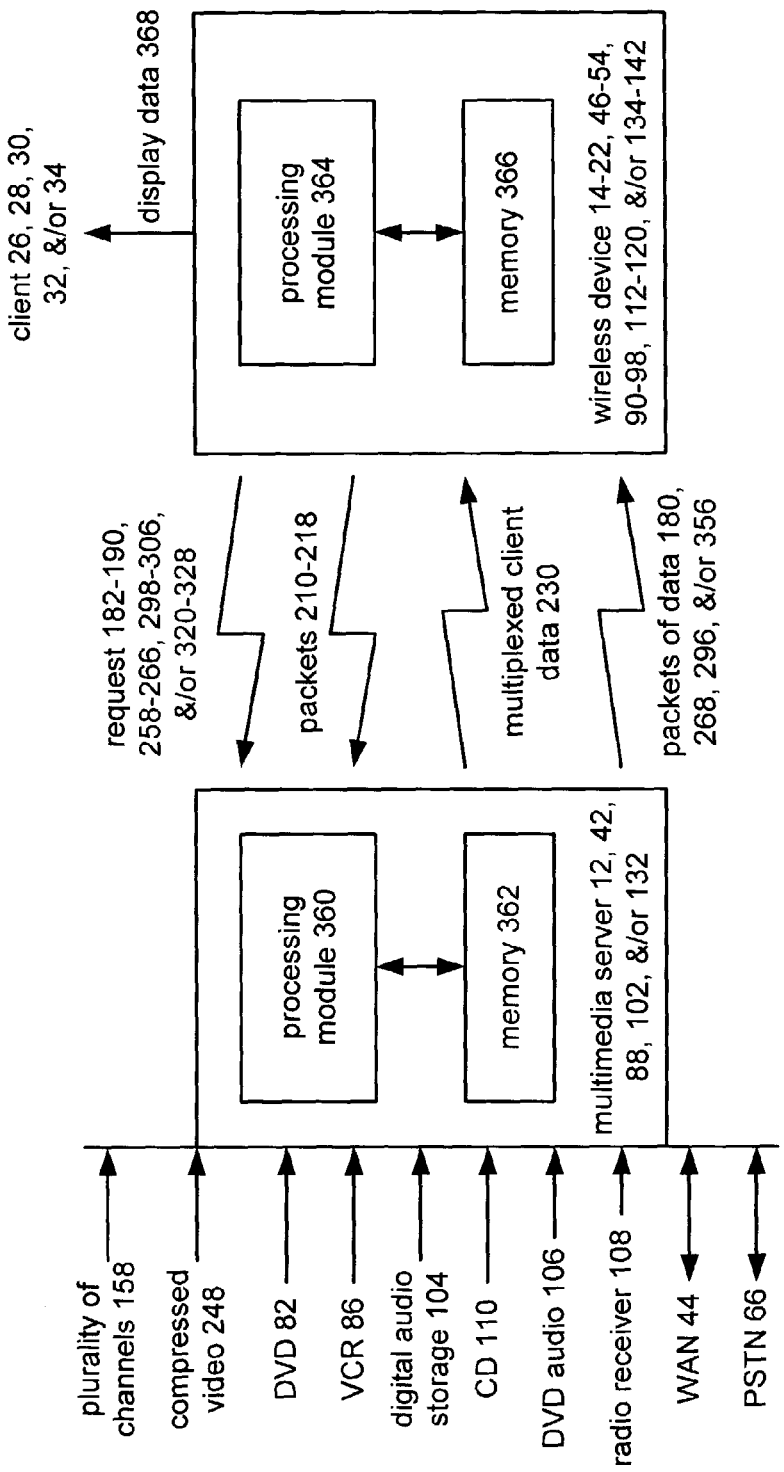
FIG. 11 illustrates a schematic block diagram of a multimedia server and a client module that may be used in any one of the multimedia communication systems of FIGS. 1-5.

FIG. 11 illustrates an alternate schematic block diagram of the multimedia communication systems shown in FIGS. 1-5. The multimedia server 12, 42, 88, 102 and/or 132 includes a processing module 360 and memory 362. The multimedia server is operably coupled to receive one or more of the multimedia sources. Such multimedia sources include a plurality of channels 158 from a satellite connection, cable connection, NTSC broadcast, PAL broadcast, and/or HDTV broadcast, compressed video 248 from a memory device, camcorder, et cetera, DVD playback 82, VCR playback 86, stored digital audio 104, CD playback 110, DCD audio playback 106, radio reception 108, internet connection 44, and/or connection to the public switch telephone network 66.

The processing module 360 may be a single processing device or plurality of processing devices. Such a processing device may be a microcontroller, microprocessor, microcomputer, central processing unit, digital signal processor, programmable gate array, state machine, logic circuitry, and/or any device that manipulates signals (analog and/or digital) based on operational instructions. The memory 362 may be a single memory device or a plurality of memory devices. Such a memory device may be a read-only memory, random access memory, system memory, flash memory, magnetic tape memory, programmable memory, erasable memory, and/or any device that stores digital information. Note that when the processing module 360 implements one or more of its functions via a state machine or logic circuitry, the memory storing the corresponding instructions is embedded within the circuitry comprising the state machine or logic circuitry.

In general, the multimedia server 12, 42, 88, 102 and/or 132 provides access for a plurality of clients to one or more of the multimedia services by receiving requests 182-190, 258-266, 298-306 and/or 320-328 from a client module. The multimedia server processes the request to produce packets of data 180, 268, 296 and/or 356 or multiplexed client data 230, depending on the type of request. In addition, the client modules may provide packets of information 210-218, which contain data for Internet connections, telephone connections, and/or client-to-client communications. The multimedia server processes packets as described generally with reference to FIGS. 1-10.

Wireless devices 14-22, 46-54, 90-98, 112-120 and/or 134-142 includes a processing module 364 and memory 366. Each wireless device is operably coupled to a client 26, 28, 30, 32 and/or 34 to provide display data 368. The display data may include audio data, video data and/or text data. The type of display data 368 will depend on the particular multimedia source being accessed for the client. The processing module 364 may be a single processing device or a plurality of processing devices. Such a processing device may be a microprocessor, microcontroller, microcomputer, central processing unit, programmable gate array, state machine, logic circuitry, digital signal processor, and/or any device that manipulates signals (analog and/or digital) based on operational instructions. The memory 366 may be a single memory device or a plurality of memory devices. Such a memory device may be a read-only memory, random access memory, erasable memory, flash memory, magnetic tape memory, system memory, and/or any device that stores digital information. Note that when processing module 364 implements one or more of its functions via a state machine or logic circuitry, the memory storing the corresponding operational instructions is embedded within the circuitry comprising the state machine and/or logic circuit. The functions performed by processing module 364 have been generally described with reference to FIGS. 1-10.

Figure 12:
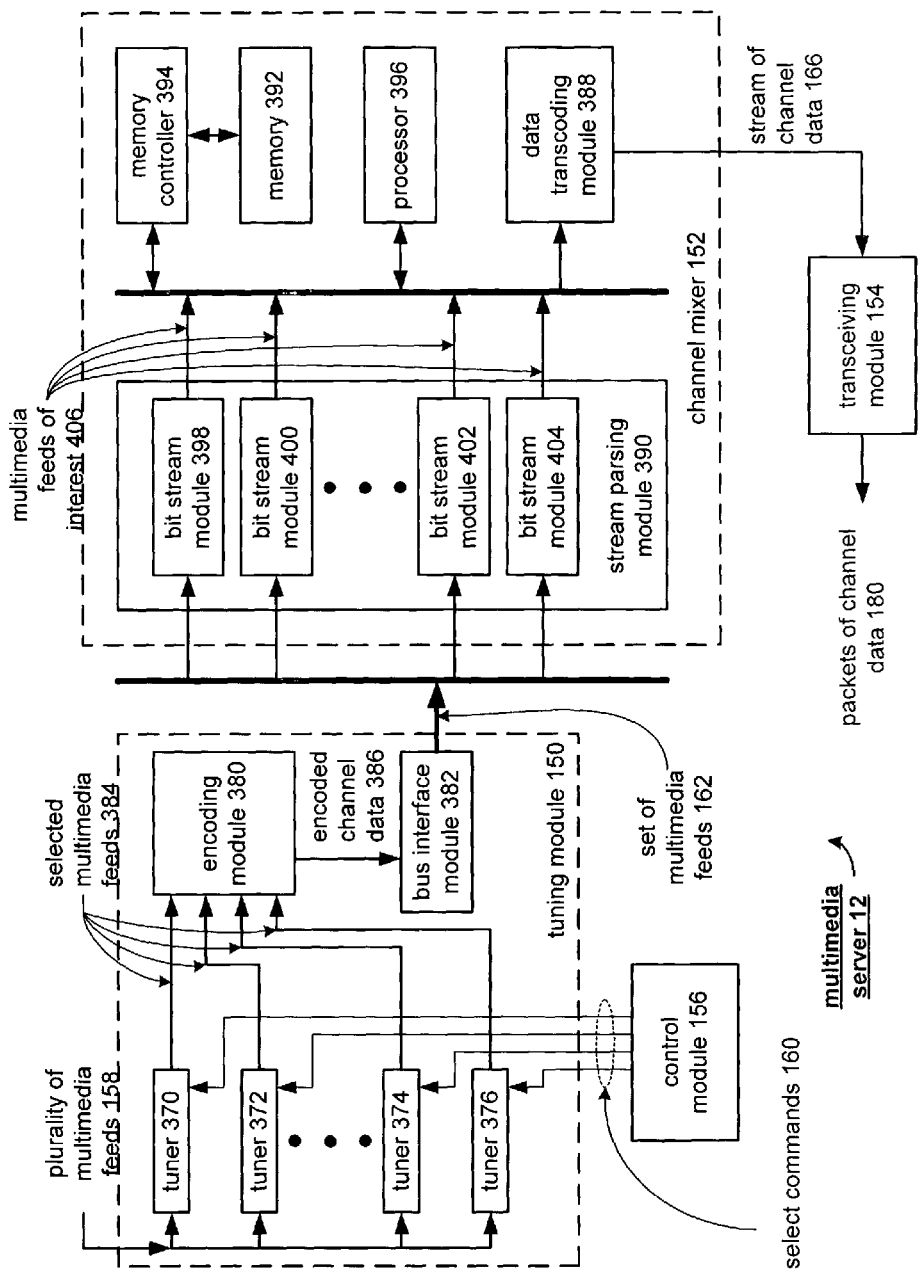
FIG. 12 illustrates a more detailed schematic block diagram of a multimedia server that may be used in the multimedia communication system of FIG. 1.

FIG. 12 illustrates a more detailed schematic block diagram of multimedia server 12 of the multimedia communication system of FIG. 1. The multimedia server 12 includes the tuning module 150, the channel mixer 152, the transceiving module 154, and the control module 156. The tuning module 150 includes a plurality of tuners 370-376, an encoding module 380, and a bus interface module 382. The channel mixer 152 includes at least one stream parsing module 390, a memory controller 394, memory 392, a processor 396, and a data transcoding module 388. The stream parsing module 390 includes a plurality of bit stream modules 398-404.

In operation, the control module 156 provides the set of channel select commands 160 to the tuning module 150. As shown, each tuner receives an individual channel select command from the control module 156. Alternatively, the control module 156 provides a stream of data containing the channel select commands 160 to the tuning module 150. The tuning module then would interpret the stream of data to identify the particular commands being received and then provide individual channel select commands to tuners 370-376. Each of the tuners 370-376 has its input coupled to receive the plurality of channels 158.

The plurality of channels may be received via a satellite connection, cable connection, NTSC broadcast, PAL broadcast, HDTV broadcast, et cetera. Accordingly, each of the tuners 370-376 would include a corresponding tuner functionality and construction. For example, if the plurality of channels 158 is being received via an NTSC broadcast, each of the tuners includes a television encoder to isolate one of the plurality of channels and produce digitized video as an output. Alternatively, if the plurality of channels 158 is received via a satellite connection, each of the tuners includes a satellite tuner as found in commercially available satellite receivers. The satellite tuner outputs, in MPEG 2 format, one or more channels of the plurality of channels. Similarly, for HDTV, cable TV, et cetera the tuners would be of a construct corresponding to the particular source of the plurality of channels. Since the construct of such tuners for each of the sources is known, no further discussion will be presented for the tuners except to further illustrate the concepts of the present invention.

Each tuner 370-376 outputs a selected channel 384 and provides it to the encoding module 380. The encoding module 380 encodes each of the selected channels 384 based on the encoding scheme used by the multimedia server 12 to produce encoded channel data 386. The encoding scheme may be one or more of multilevel encoding, non-return to zero encoding, Manchester encoding, block encoding and/or nB/mB encoding where in n>m. For example, the nB/mB may be 4 B/5 B encoding where 4 bits of actual data are converted into 5 bits of encoded data. In addition, the encoding attaches a header portion, which identifies the particular channel. The encoded channel data 386 is placed on a bus coupling the tuning module 150 to the channel mixer 152 by a bus interface module 382.

The bus interfacing module 382 places the encoded channel data 386 on the bus in accordance with the particular data transport scheme used within multimedia server 12. For example, the data conveyance protocol may be carrier sense multi-access, TDMA, et cetera.

The channel mixer 152 is operably coupled to receive the encoded channel data 386 from tuning module 150. The channel mixer 152 receives the encoded channel data 386 via the stream parsing module 390. The stream parsing module 390 includes a plurality of bit stream modules 398-404. Each of the bit stream modules 398-404 monitors the bus for data corresponding to a particular channel of interest. Accordingly, each of the bit stream modules 398-404 is allocated to process data related to a particular client module. For example, bit stream module 398 may be allocated to process data for wireless client module 14 of FIG. 1, while bit stream module 400 is allocated to process data for wireless client module 16 of FIG. 1, et cetera.

Each bit stream module 398-404 includes a bus interface module (not shown) to monitor the bus to detect the identity of the relevant data. As one of average skill in the art will appreciate, alternatively, the channel mixer 152 may include a bus interface module that provides a single connection to receive all of the data, wherein the bus interface module interprets the data and provides it to the appropriate bit stream module 398-404. Each of the bit stream modules 398-404 isolates data of its corresponding channel of interest 406 and provides the data to memory 392 via memory controller 394.

As the data corresponding to each channel of interest 406 is stored in memory 392, the processing module 396 is converting the channel of interest 406 from its original format into generic data. The processor 396 causes the generic data to be stored in memory 392 via memory controller 394. For example, if the channel of interest corresponds to video data received from one of the multimedia sources, the processor converts the specific formatted video data (e.g., MPEG II) of the multimedia source into a generic video data. Such generic video data may be formatted as MPEG video data, JPEG data, M-JPEG video data, digital RGB data and/or digital YCBCR data.

If the data for the channel of interest is audio data, the processor 396 converts the format of the audio data from its original format into generic audio data, such as MPEG formatted audio data, MP3 formatted data, and/or PCM digitized audio data.

The data transcoding module 388 retrieves the generic data 392 from memory via the memory controller 394 to produce a stream of channel data 166. If the generic data is generic video data, the transcoding module 388 converts the generic video data into a specific video data format, such as MPEG II, to produce the stream of channel data 166. If, however, the generic data includes generic audio data, the data transcoding module 388 converts it into a specific audio format, such as MP3. If the data is Internet data, telecommunication data, and/or client-to-client communication data, the transcoding module 388 provides the data unaltered as part of the stream of channel data 166.

The transceiving module 154 receives the stream of channel data 166 and processes it to produce packets of channel data 180. The processing performed by the transceiving module 154 is in accordance with the data conveyance protocol of the multimedia server. As such, the processing adds overhead information to identify the particular portions of the stream of channel data 166 that is destined for individual client modules.

Figure 13:
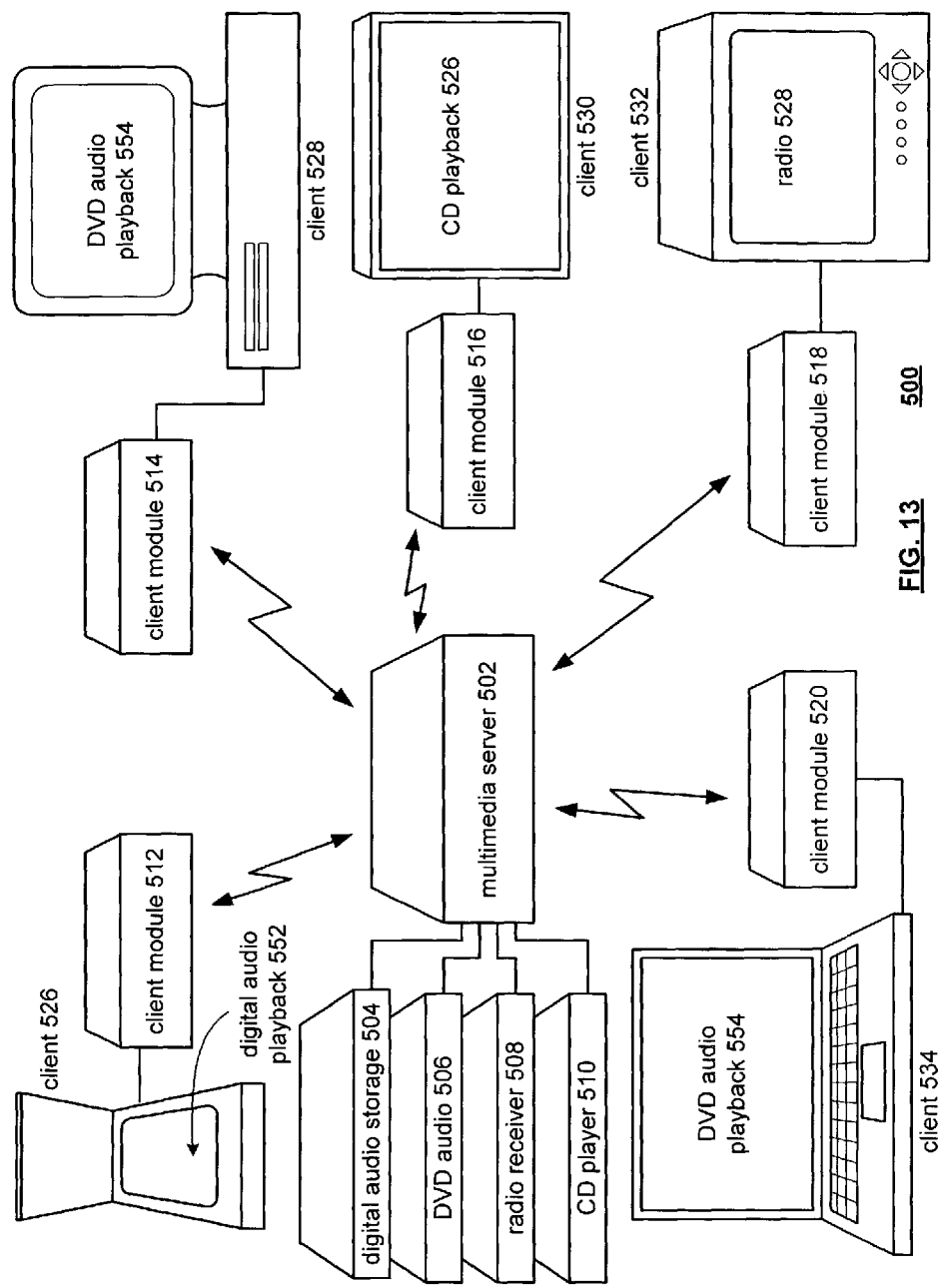
FIG. 13 illustrates a schematic block diagram of yet another multimedia communication system in accordance with the present invention.

FIG. 13 illustrates a schematic block diagram of a multimedia system 500 that includes a multimedia server 502, a plurality of wireless client modules 512-520, a plurality of clients 526-534, a digital audio storage device 504, a DVD audio device 506, a radio receiver 508, and a CD player 510. In this illustration, the multimedia system 500 provides a selection of multiple audio sources to a plurality of clients without requiring an independent and direct connection to each of the audio sources.

In operation, the client modules 512-520 receive a selection request from their respective clients. The selection request selects audio playback from the digital audio storage device 504, which may be storing MP3 files, digitized audio, et cetera, the DVD audio player 506, the radio receiver 508, the CD player 210, and/or any other type of audio source.

Upon receiving the selection request, the multimedia server 502 processes the request to authenticate it and, once authenticated, retrieves data from the appropriate audio source 504-510. The multimedia server 502 provides the audio data from the audio sources 504-510 along a single transmission stream or along multiple simultaneous and synchronized transmission streams to client modules 512-520. Each of the wireless client modules 512-520 receives the transmission and extracts the relevant portions for its client. Multimedia server 502 can comprise a multi-channel transmitter implementing a method for synchronized channel transmission in accordance with the teachings of this invention. The functionality of multimedia server 502 may be implemented utilizing discrete components and/or integrated circuits with accompanying software and is analogous to the functionality of multimedia server 12 of FIG. 1.

As shown in FIG. 13, client 526 has selected to display audio from the digital audio storage device 204. Accordingly, the client 526 provides the selection request to client module 512, which is subsequently provided to the multimedia server 502. The multimedia server 502 processes the request and initiates the playback from the digital audio storage device 504. The audio playback data from the storage device 504 is received by the multimedia server 502, which provides it, along with other audio playback data from other audio sources, to the client modules. The transmission from the multimedia server 502 may be in packets and/or frames. Each packet and/or frame includes a header section that identifies the source of the data and/or the destination of the data. Accordingly, client module 512 monitors the transmission or transmissions for data addressing it and/or identifying the digital audio storage device 504. Upon detecting such data within the transmission(s), wireless client module 512 extracts the data and provides it to the client 526 for digital audio playback 552. Similar functionality is provided for the other clients and client modules.

Figure 14:
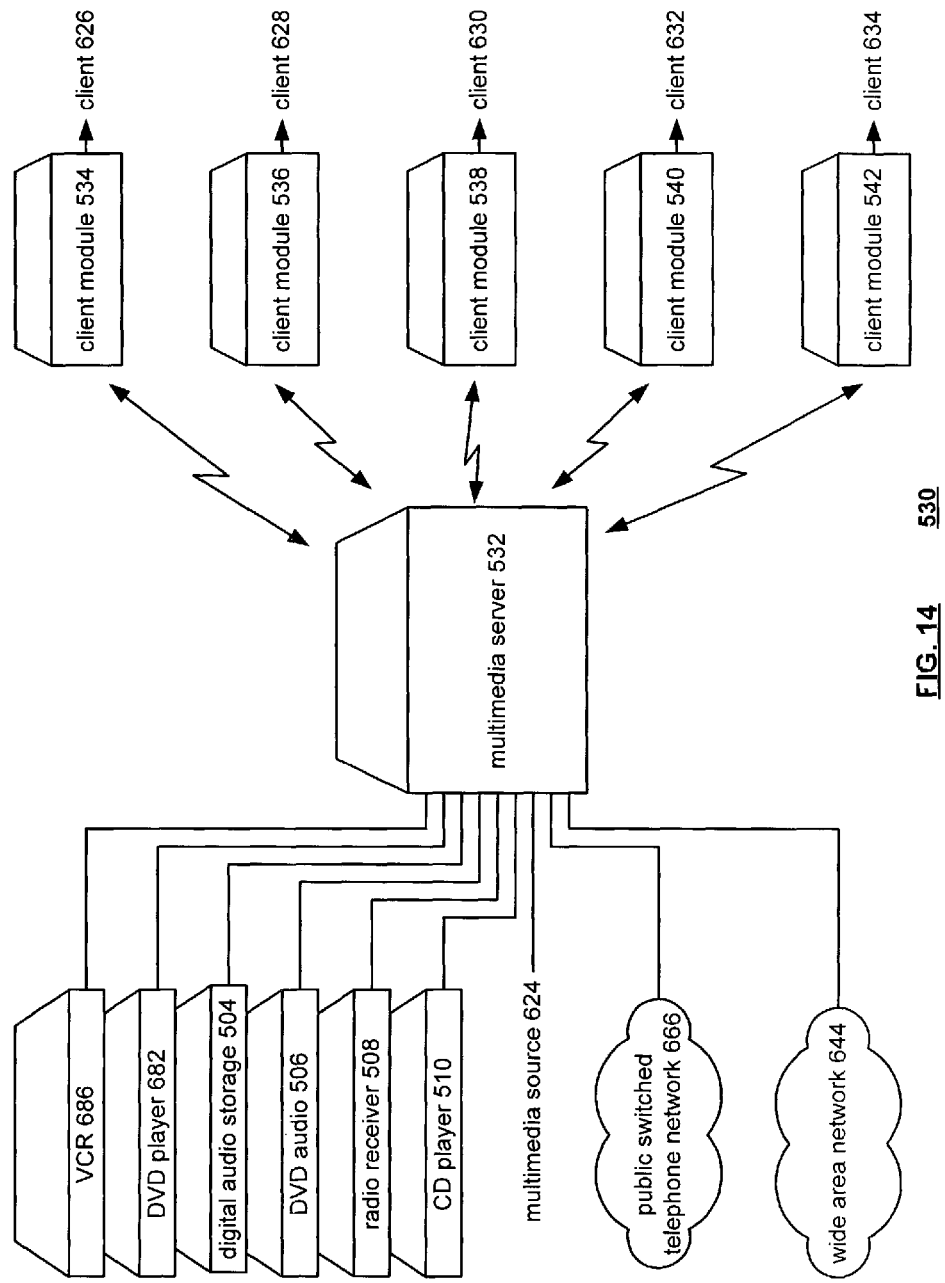
FIG. 14 illustrates a schematic block diagram of a still further multimedia communication system in accordance with the present invention.

FIG. 14 illustrates a schematic block diagram of a multimedia system 530 that includes multimedia server 532, client modules 534-542, various clients 626-634, and a plurality of multimedia sources. The multimedia sources include VCR 686, DVD player 682, digital audio storage device 504, DVD audio 506, radio receiver 508, CD player 510, multimedia source 624, public switch telephone network 666, wide area network 644, and/or any other type of audio and/or video source. In system 530, clients 626-634 may select playback from, and/or connection to, any one of the multimedia sources. The selection request from each client module would identify the desired multimedia source, the client, the desired service and any other information to assist the multimedia server 532 in processing the request. As such, one client may be accessing the Internet, while another client is watching a satellite broadcast channel, while another is listening to a CD playback, while another is talking on the telephone, and yet another is watching a DVD playback. This is all done via the multimedia server 532 without requiring the clients to have direct access to the multimedia sources and without the requirement that each client have its own multimedia source and/or multimedia source connection. In essence, multimedia server 532 provides the functionality of one or more of multimedia servers 12, 42, 88 and 202 of FIGS. 1-5 in accordance with the teachings of this invention. Wireless client modules 534-542 provide the functionality of one or more of the client modules described generally with reference to FIGS. 1-5.

Figure 15:
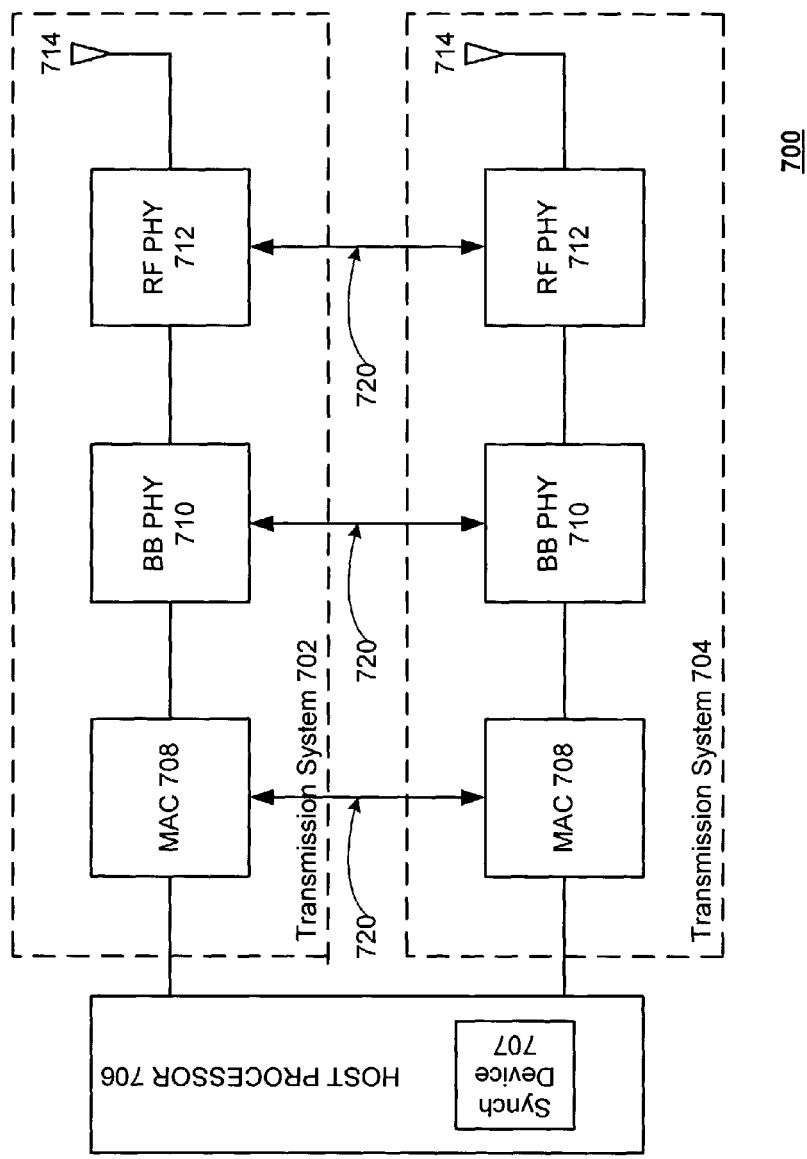
FIG. 15 illustrates a schematic block diagram of a multi-channel transmitter in accordance with this invention.

An embodiment of a multi-channel transmitter implementing the affiliation method of this invention is illustrated in FIG. 15. Multi-channel transmitter 700 comprises two distinct transmission systems 702 and 704 that share a host processor 706. Each transmission system 702 and 704 comprises a media access controller ("MAC") 708, a baseband physical layer ("BB PHY") module 710, an RF physical layer ("RF PHY") module 712 and an antenna 714. The host processor 706 is operably coupled to provide the raw data (e.g., downstream), without processing, in the form of a data stream to each MAC 708. In the embodiment of FIG. 15, synchronization of the channel transmission is implemented within host processor 706 as an algorithm within a synchronization device 707. The two transmission system channels in this embodiment are thus synchronized by the host processor 706 and provided as synchronized streams of data to the MACs 708. Synchronization of the channels within host processor 706 comprises synchronizing the starting point of the distinct data streams.

Each of the MACs 708 is operably coupled to packetize its respective data stream (partition the data into packets and format it according to the protocol in use by the transmitter system 702 or 704) to produce a plurality of data packets, which are then provided to their respective BB PHY module 710. Each MAC 708 can further encrypt its data stream and determine a modulation scheme for the data. For example, the modulation scheme can be orthogonal frequency-division multiplexing. In a multi-MAC embodiment, one MAC 708 can be a master MAC 708, and the other MAC(s) 708 can be slave MAC(s) responding to inputs from the master MAC 708. As shown in FIG. 15, multi-channel transmitter 700 can further comprise connections 720 between like modules to communicate synchronization and timing data.

Each BB PHY module 710 is operably coupled to baseband process its respective plurality of data packets to produce a plurality of symbols for each of its plurality of data packets. Baseband processing a plurality of data packets can further comprise appending a cyclic redundancy code ("CRC") to each data packet of the first and the second plurality of data packets for error correction purposes. Each RF PHY module 712 is operably coupled to convert its respective plurality of symbols received from its corresponding BB PHY module 710 into a radio frequency signal. The radio frequency is an analog signal that is then transmitted from an antenna 714. The radio frequency signals transmitted from different antennas 714 are transmitted along distinct channels and can be transmitted contemporaneously without interfering with one another because the channels are synchronized to avoid interference.

Synchronization device 707 implements the algorithm for synchronizing the channel transmission. In the embodiment illustrated in FIG. 15, the synchronization module 707 is incorporated within host processor 706. Synchronization device 707 can be incorporated, in different embodiments discussed more fully below with reference to FIGS. 16, 17A and 17B, within a MAC 708, a BB PHY module 710 or an RF PHY module 712 to perform the channel synchronization. Synchronization device 707 can thus be operably coupled to synchronize at least one of: generating the distinct data streams, packetizing the data streams, baseband processing the distinct pluralities of data packets, and converting the distinct pluralities of symbols.

Figure 16:
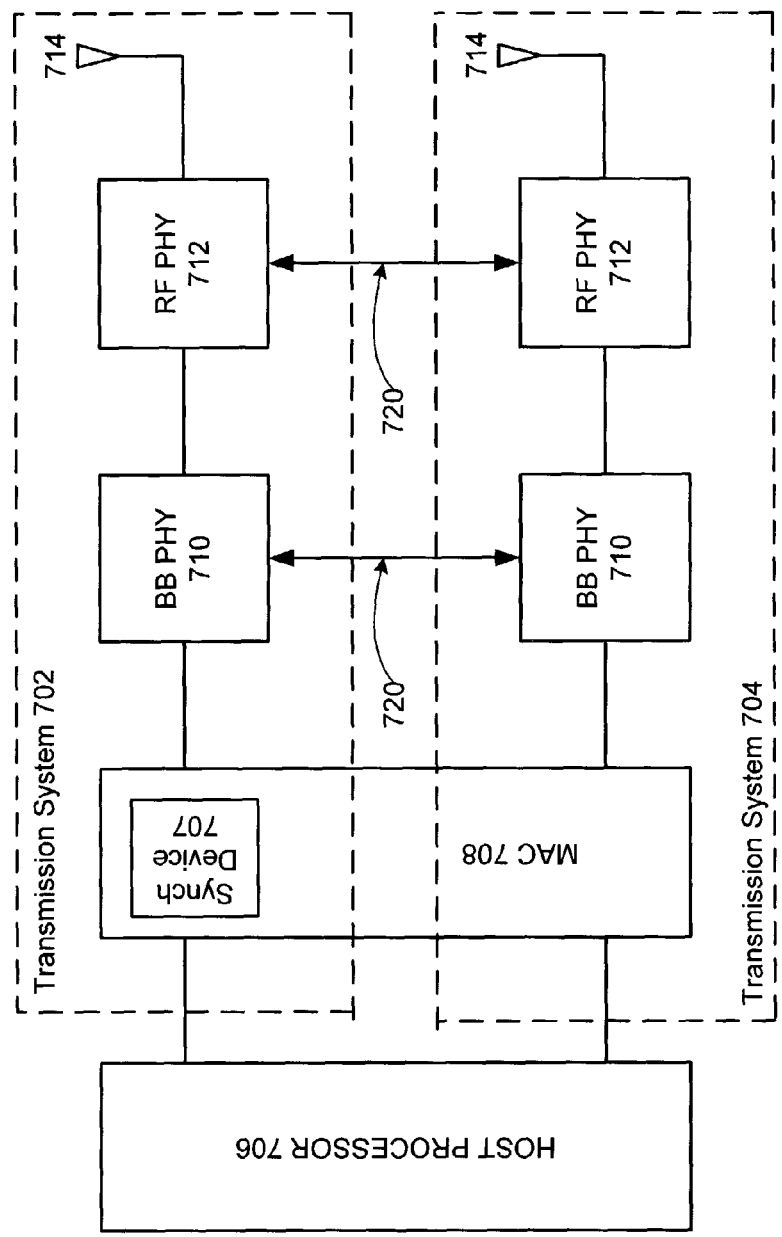
FIG. 16 illustrates a schematic block diagram of another multi-channel transmitter in accordance with this invention.

FIG. 16 is a schematic block diagram illustrating an embodiment of the present invention implemented within a multi-channel transmitter, wherein the channel synchronization is performed by a MAC 708. In this embodiment (a two channel embodiment as in FIG. 15), multi-channel transmitter 722 comprises a single MAC 708. Two distinct data streams are generated by the single host processor 706 and then synchronized within the MAC 708. The MAC 708 synchronizes the packetizing of the data streams and provides two distinct signals, each comprising a plurality of data packets, one to each of two BB PHY modules 710. The operation of the embodiment of FIG. 16 is otherwise the same as the operation of the embodiment of FIG. 15.

Synchronizing packetizing of the distinct data streams within a MAC 708 can comprise synchronizing the transmission of a first packet in one plurality of data packets with the transmission of a first packet in the other plurality of data packets. Synchronizing the transmission of the first packets in each plurality of data packets can comprise delaying the transmission of either first packet to match the transmission time of the first packet of one channel with the transmission time of the first packet of the other channel. Alternatively, synchronizing packetizing of the distinct data streams within a MAC 708 can comprise synchronizing the transmission of each packet of one plurality of data packets with the transmission of a corresponding packet of the other plurality of data packets. A corresponding packet on one channel can be a closest-in-time packet to a packet on the other channel. Synchronizing the transmission of each packet in one data stream with a corresponding packet in another data stream can further comprise delaying, on a packet-by-packet basis, the transmission of either a packet on one data stream and/or the corresponding packet on the other data stream.

Figure 17A:
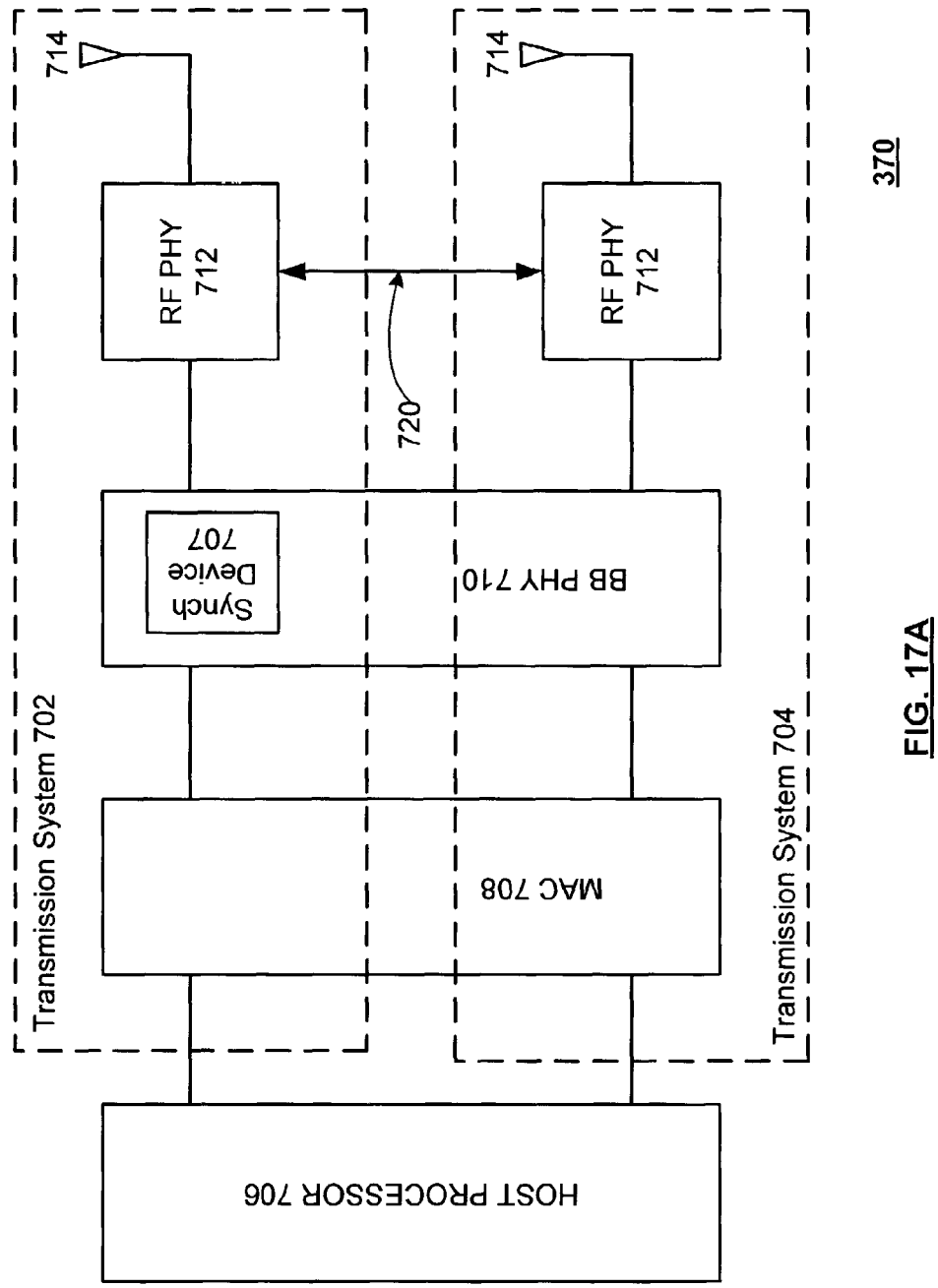
FIGS. 17A and 17B illustrate schematic block diagrams of still further multi-channel transmitters in accordance with this invention.
Figure 17B:
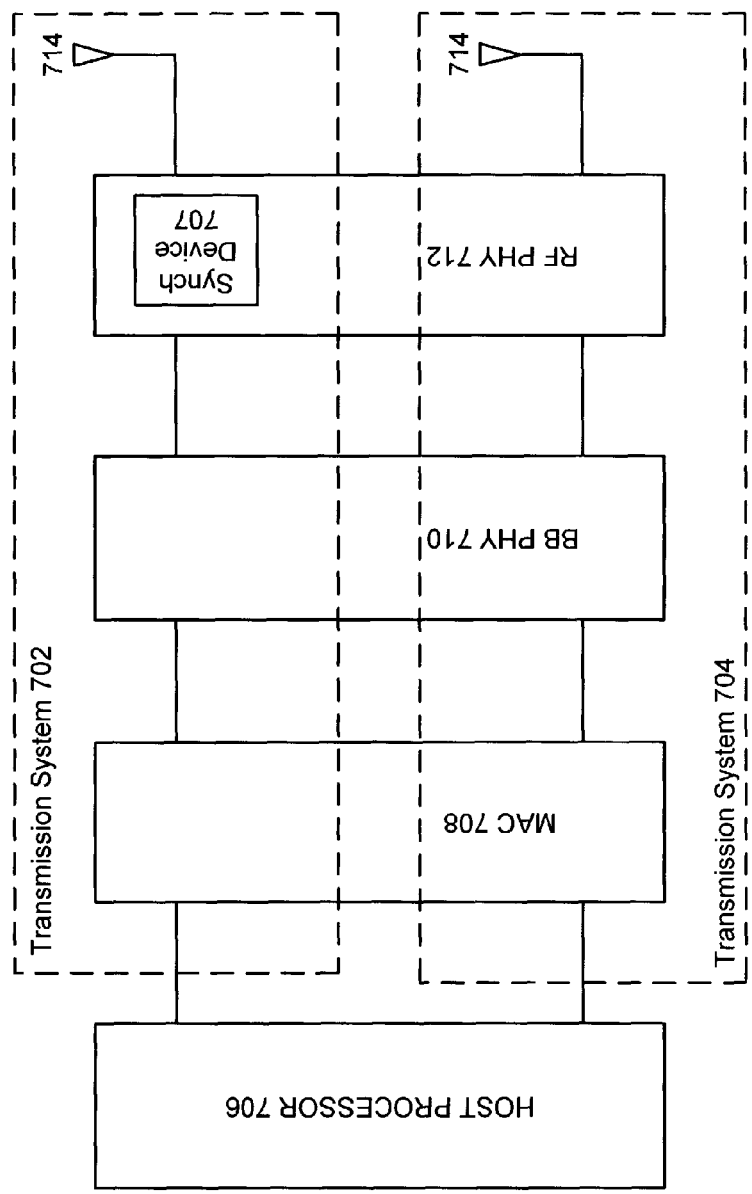

FIGS. 17A and 17B are schematic block diagrams illustrating embodiments of a multi-channel transmitter in accordance with this invention wherein the channel synchronization is performed at a BB PHY module 710 and at an RF PHY module, respectively. The BB PHY modules 710 and RF PHY modules 712, when incorporating the synchronization device 707, provide channel synchronization by synchronizing the symbol boundaries of the plurality of symbols along the distinct channels. Within a BB PHY module 710 of multi-channel transmitter 730 of FIG. 17A, synchronizing the baseband processing of the distinct pluralities of data packets comprises synchronizing a symbol boundary of one or more of the plurality of symbols on one channel with a symbol boundary of one or more of the plurality of symbols on the other channel. Synchronizing of the symbol boundaries can further comprise synchronizing a guard interval of one or more of the plurality of symbols on one channel with a guard interval of one or more of the plurality of symbols on the other channel.

Channel synchronization can also be performed within an RF PHY module 72 of a multi-channel transmitter 740, as in the embodiment illustrated in FIG. 17B. As shown, a single RF PHY module 712 receives, in this example, two distinct data channels comprising a first plurality of symbols and a second plurality of symbols. The RF PHY module 712 converts the first and second plurality of symbols into a first and second radio signal, respectively. The RF PHY module 712, via synchronizing device 707, synchronizes the channel transmission by synchronizing the converting of the first and second plurality of symbols. Synchronizing the converting of the first and second plurality of symbols comprises synchronizing a symbol boundary of one or more of the first plurality of symbols with a symbol boundary of one or more of the second plurality of symbols. Synchronizing of the symbol boundaries can further comprise synchronizing a guard interval of one or more of the first plurality of symbols with a guard interval of one or more of the second plurality of symbols, as in the embodiment of FIG. 17B. The operation of the like components of FIGS. 15-17B are otherwise the same.

Channel affiliation and allocation algorithms have been analyzed to determine how fairly and efficiently channel resources are allocated. As a baseline, all even numbered clients are assigned to a channel A and all odd numbered clients to a second channel B. The timeslots on each channel were then given equal durations. For example, if three clients are assigned to channel A and two clients are assigned to channel B, the duty cycle of all clients on channel A is ⅓ and the duty cycle of the clients on channel B is ½. Packet sizes were set to 1500 bytes for all clients for which Cn=>30 mbps and to 500 bytes for all clients in which Cn<30 mbps. This analysis is illustrated in FIG. 18.

Figure 18:
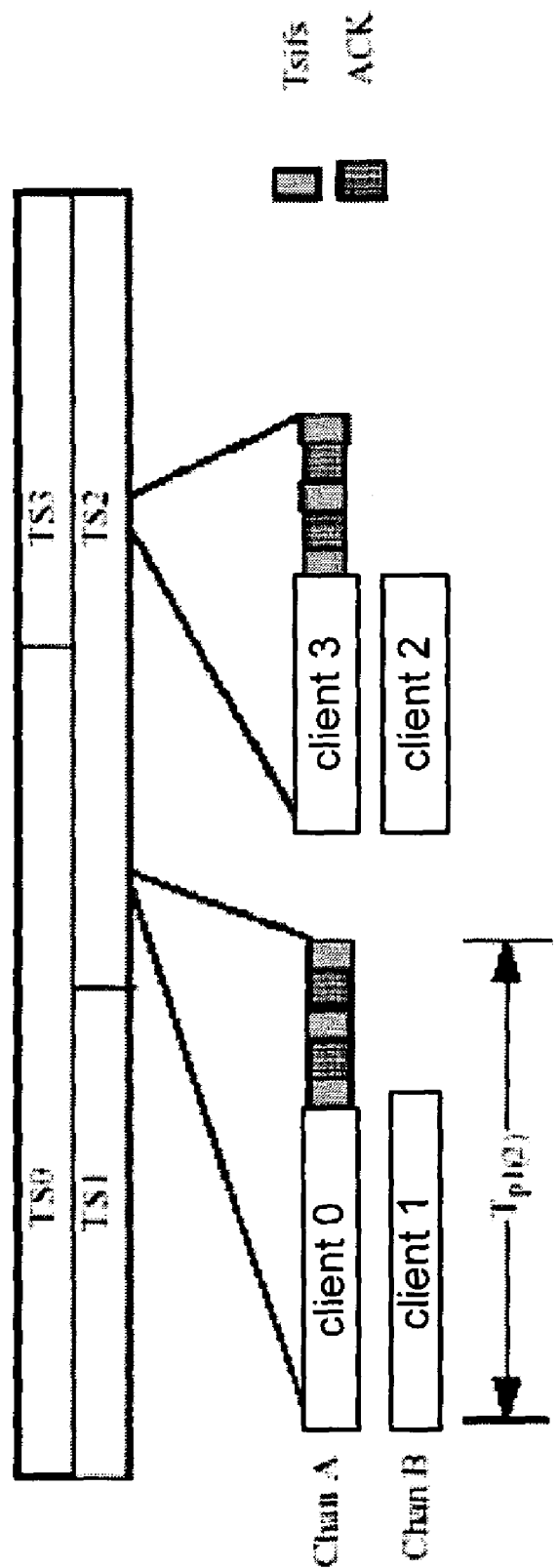
FIG. 18 shows an overview of one transmitted signal format utilized within the present invention.

The analysis illustrated in FIG. 18 was performed using four clients consisting of the following:
   Client 0 PDA $r_{d0}$=1 Mb/s
   Client 1 SDTV $r_{d1}$=4.5 Mb/s
   Client 2 SDTV $r_{d2}$=4.5 Mb/s
   Client 3 HDTV $r_{d3}$=20 Mb/s
Where $r_{dn}$ is the desired rate for client n. Note that the packet durations may not match, resulting in some loss of data rate due to the fixed packet sizes. The duty cycle of all timeslots is 50% since there are two clients on each channel; i.e., TS0=TS1=TS2=TS3. For video, this would be the rate at which video quality was considered acceptable. Note that the actual rate delivered to the client, $r_n$, may be higher or lower. In this analysis, clients 0 to 2 were given channels with all combinations of $C_n$=6, 9, 12, 18, 21, and 24 Mb/s, while client three was iterated through $C_3$=30, 36, 42, 48, 54, 62, and 66 Mb/s. With 6 rates used on clients 0-2 and 7 rates on client 3, the total number of different tests is 6^3*7=1512. The results of this analysis are illustrated in the graphs of FIGS. 19 and 20.

Figure 19:
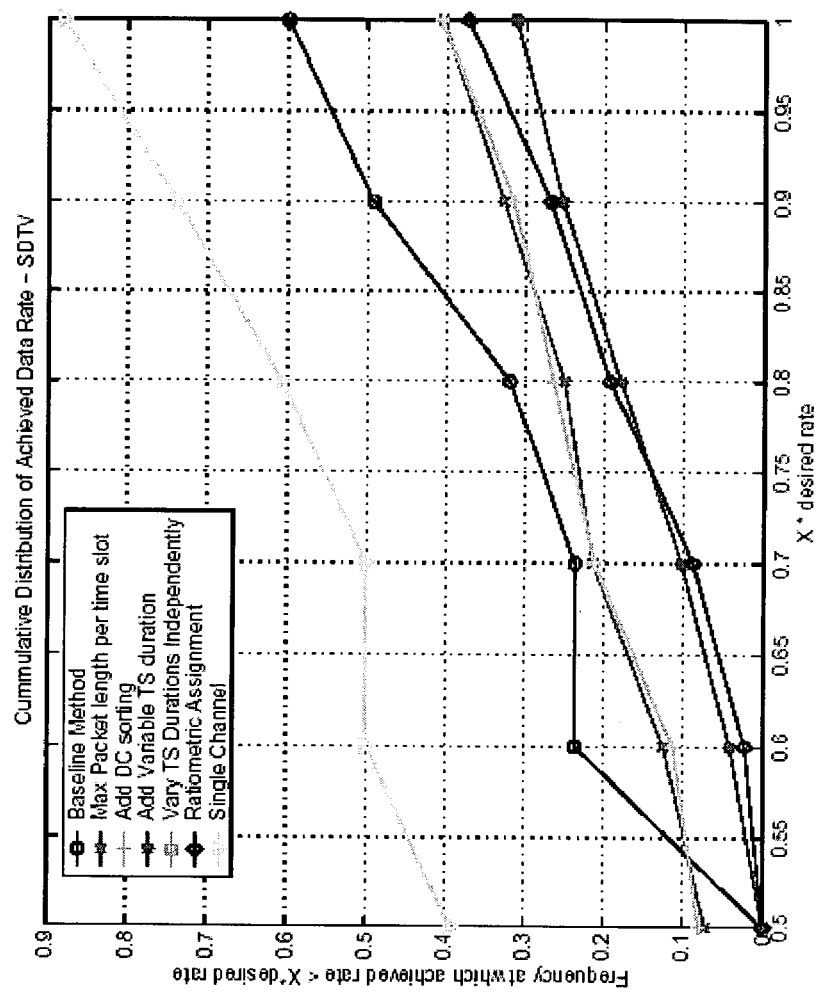
FIG. 19 provides experimental results indicative of network efficiency within the present invention.
Figure 20:
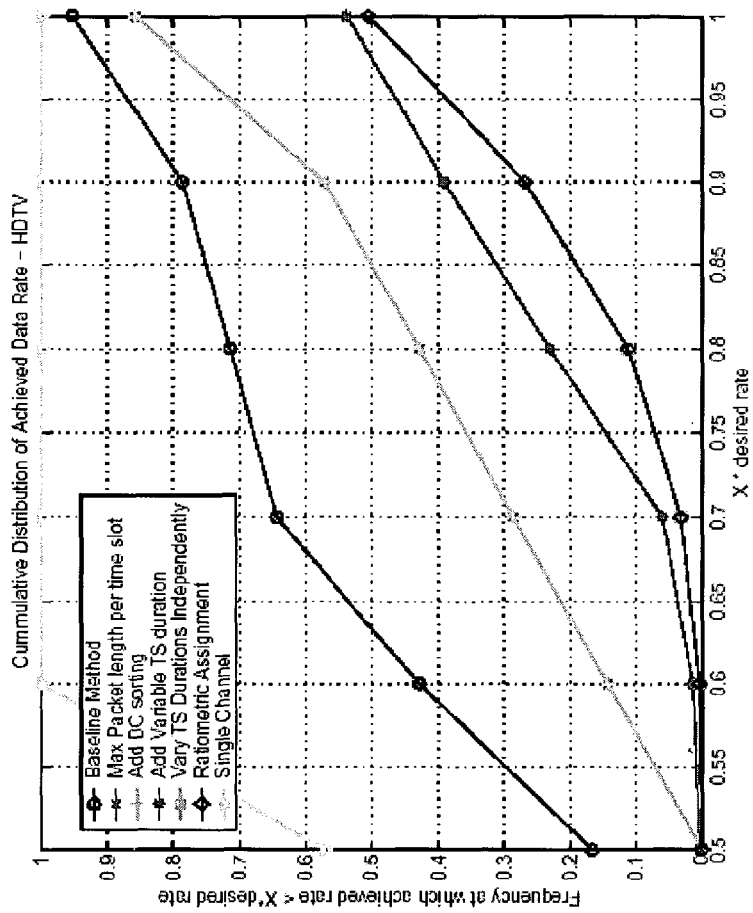
FIG. 20 provides further experimental results indicative of network efficiency within the present invention.

As shown in FIGS. 19 and 20, the y-axis provides the percentage of cases in which the data rate on the x-axis was exceeded, so this is effectively the cumulative distribution function. Note that the data rate for the PDA (client 0) was always exceeded for every algorithm considered and for every rate configuration. It was therefore not graphed. Further, clients 1 and 2 are nearly identical, so the results for these two clients are reported only once. There is a small difference that will show up in later algorithms due to the use of < or <= in a sort routine which provides a slight bias. This is still arbitrary so the results of clients 1 and 2 are simply averaged and reported once.

A modification to the algorithm allows more variation in packet sizes, which allows the packets in TS0 and TS1 to be identical in size and a maximum length is given to the respective clients. The packets on TS2 and TS3 are also allowed to be identical and are provided a maximum length. This was done by setting the packet length of the higher rate of the two channels in the given time slot to the maximum packet length and setting the packet length of the other channel in the pair such that the duration is the same. This is done by scaling the packet length plus MAC and CRC overhead by the ratio of the channel rates. Notice that this modification does slightly increase the percentage of cases in which clients 2 and 3 fail to meet 50% of the desired data rate. This is due to one of these clients being paired with the HDTV client, resulting in a packet size of less than 500 bytes. Closer examination shows that the clients that failed at this level are only slightly lower in rate than a large group in the previous setup that fall just above 50%. The problem also goes away when further modifications are considered. It does point out that giving clients exactly equal packet lengths may not always be optimal.

Another modification to the above algorithm is to sort the clients by desired duty cycle before assignment to channel A or B. The desired duty cycle is defined as:

$$d_{dn} = r_{dn}/C_n \quad \text{Equation 3}$$

Once the clients were sorted by desired duty cycle, the client with the largest $d_d$ and the client with second largest $d_d$ were given the first time slot on channels A and B, respectively, and then the clients with the lowest $d_d$ were paired in time on the second timeslot on channels A and B. The idea behind this pairing is that channels with similar duty cycle requirements should have more equal packet lengths. The results of this sorting were not substantial; they are mainly included as a step to later algorithms.

A further modification is to allow TS0 and TS2 (TS1 and TS3) to be different lengths. This is the step in which ordering by desired duty cycle really comes into play. Now the two clients that want the highest duty cycle and the two that want the lowest duty cycle are paired. This will generally cause the first set of timeslots to be lengthened at the expense of the second set. The question, which arises, is how to perform this assignment. This type of problem is often solved using a cost function. A cost function in this case will assign a certain cost to removing bit rate from a client. The cost of removing bit rate from a client should be a function of both the present bit rate and the desired bit rate. It is assumed in the following derivation that the clients have been ordered by desired duty cycle, client 0 having the highest desired duty cycle and client N−1, the lowest. The cost function used in this simulation is:

$$K_n = r_{dn}/r_n \quad \text{Equation 4}$$

This function will assign a high cost to lowering the bit rate significantly below the desired rate, but will not change much when the bit rate is higher than the desired rate. In this sense, it would seem to meet the fairness criteria, i.e., it will try to give each client sufficient bit rate. The goal of the channel allocation is now to maximize the total cost function. Substituting Equation 2 $[r_n = C^*(T_n/(T_n+W_n))^*(TS_n/Tpcf)]$ into Equation 4 yields:

$$K = \Sigma r_{dn}/(C_n^*(T_n/(T_n+W_n))^*(TS_n/Tpcf)) \quad \text{Equation 5}$$

If we assume that the MAC overhead is small, then:

$$K = Tpcf^* \Sigma r_{dn}/(C_n^*TS_n) \quad \text{Equation 6}$$

Or $$K = Tpcf^* \Sigma d_{dn}/TS_n \quad \text{Equation 7}$$

Finally, note that for N=4, each channel has two timeslots of equal length. To solve the above problem, we substitute TS1=TS0, TS2=TS3=Tpcf−TS0, take the derivative with respect to TS0, and solve for the maximum. The solution is given by:

$$TS0/Tpcf = 1/(1+sqrt(B/A)) \quad \text{Equation 8}$$

Where
$A = d_{d0} + d_{d1}$
$B = d_{d2} + d_{d3}$

With multiple channel transmit capability, the embodiments of the present invention provide the capability to allocate channel usage intelligently to meet the requirements desired for a given application. The complex problem of allocating channel resources in a particular application has no single solution. However, a data transmission system implementing an embodiment of this invention can allocate channel resources in a manner that best fits the level of quality of service desired for individual clients. How to efficiently manage the available channel bandwidth (e.g., do we favor higher bandwidth clients? Do we allow the MAC to intervene if too many slow clients wish access?) can differ for different applications and the embodiments of this invention provide an adaptable means for allocating these resources.

Figure 21:
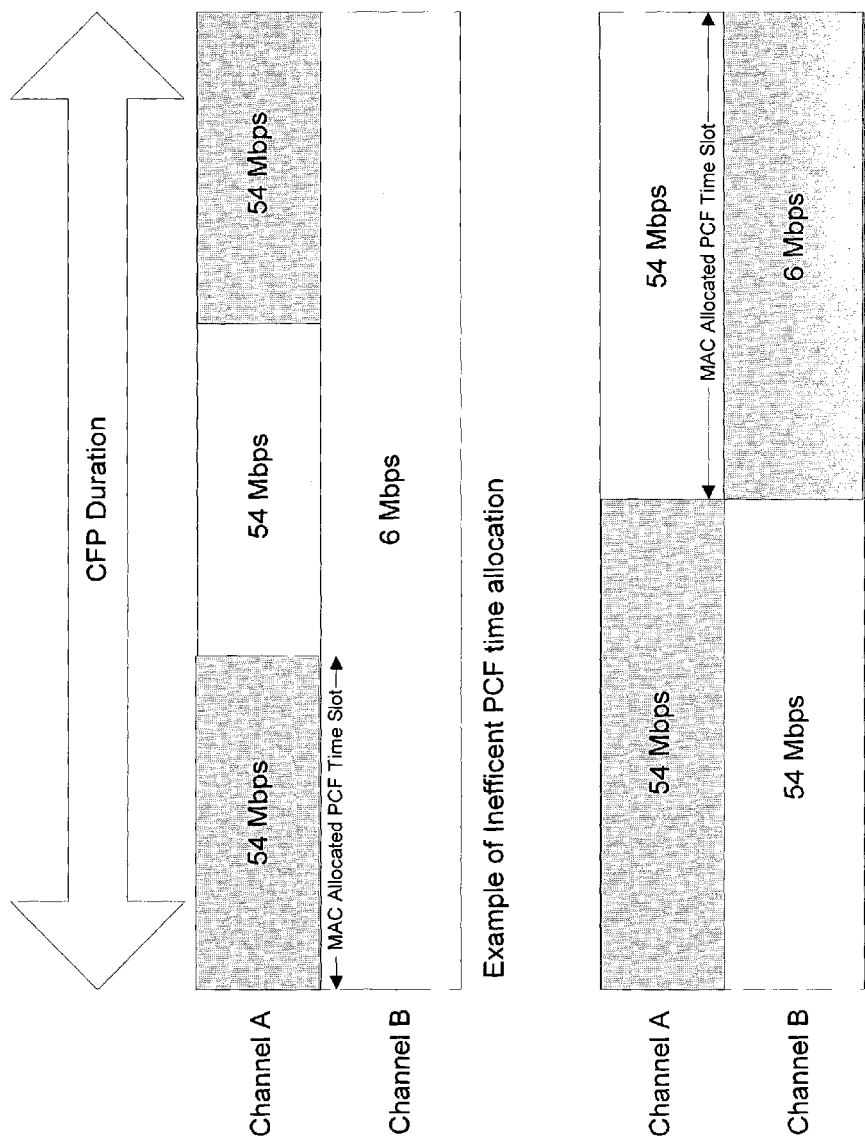
FIG. 21 shows the utilization of two channels, Channel A and Channel B respectively, in accordance with this invention.

FIG. 21 illustrates a channel allocation scheme for two channels, Channel A and Channel B. The MAC of a system implementing an embodiment of this invention will assign clients to Channel A or to channel B in a manner such that the sum of all the client's transmission rate on channel A is closest to the sum of those on channel B. That is, Σ(Channel A Transmission Rates)−Σ(Channel B Transmission Rates)→~0. This will ensure a fair balance over both channels. For example, as shown in FIG. 21, three clients at 54 Mbps on Channel A and one client at 6 Mbps on channel B is not a desired allocation of channel resources as it will force three high bandwidth connections to share one channel. A better approach would be to have two 54 Mbps clients on Channel A and one 54 Mbps client and the 6 Mbps client on Channel B. The algorithm for this scheme is easy to implement. All that is required is to order the clients from the client having the largest transmission rate down to the client having the lowest transmission rate. Clients are then added one at a time to the channel whose transmission sum is lowest.

Once all clients have been divided between Channels A and B, the MAC will divide the PCF time among the clients on each channel evenly. In other words, each client will be treated equally (For unequal PCF distribution, see QoS Section below). The PCF time assignment for each channel is static and will remain the same until a client joins or leaves the channel. To see how equal time division is useful requires an understanding of how ABFM works. ABFM is the central component that possesses the sole authority to determine the output bit rate of a particular stream. ABFM decides which bit rate to use based on various input factors, some of which are: incoming raw source bit rate from satellite, client's ability in displaying video, client preferred status and of course available network bandwidth. The MAC merely provides a venue to transmit data. It must however, provide ample information such that the ABFM layer can make intelligent decisions.

More specifically the MAC must provide actual MAC-to-MAC throughput values for each client.

As mentioned earlier, when a client X joins a channel, the MAC will divide the PCF time evenly amongst all clients on the channel. This PCF time division will remain static until a client joins or leaves the channel, with the exception of QoS. The MAC will profile the current throughput and relay it back to the ABFM layer so that it can choose an appropriate bit rate to begin sending data to client X. If client X experiences difficulty in data reception, it will be reflected in the throughput value sent from the MAC. The ABFM layer will then downgrade the stream bit rate accordingly.

If instead the bandwidth to client X increases (e.g., due to higher PHY transmission rate), the throughput to client X will also increase, even if the incoming bit rate from the server has not changed. The following example will illustrate this situation: client X's throughput is 4 Mbps. The ABFM layer will stream data at a rate of 4 Mbps to the client. If the PHY transmission rate increases to 18 Mbps one of two (2) possibilities will occur, both of which will result in an increase of throughput reported for client X:

Scenario One:

There is an inherent delay between the moment when the server (application level) initiates a send and when the MAC actually transmits the packet. During this time, packets to be transmitted will collect in client X's transmit queue within the MAC. As long as this queue contains pending packets to be sent, the MAC will have data to transmit if the PHY transmission rate increases. As a result, it will yield a higher throughput rate.

Figure 22:
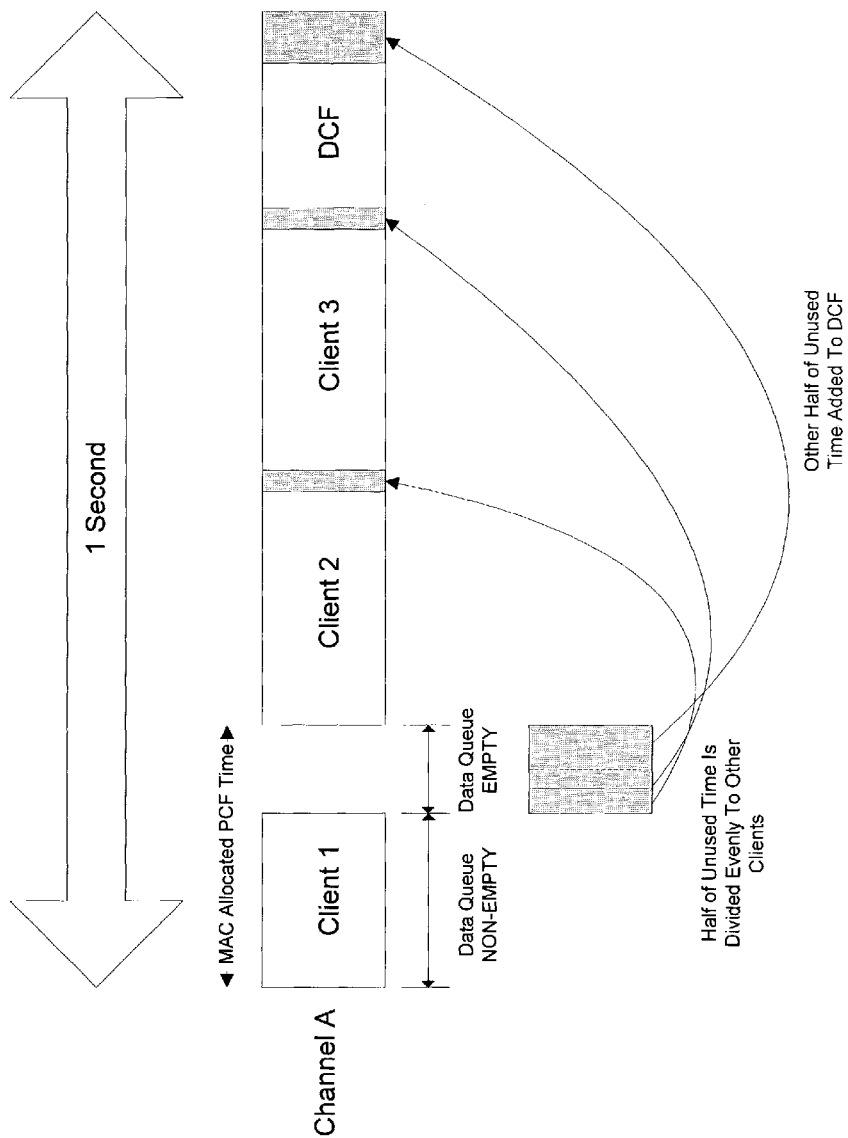
FIG. 22 depicts a PCF utilization scheme in accordance with the present invention.

Scenario Two:

When the PHY transmission rate changes from 6 Mbps to 18 Mbps, the MAC will empty client X's transmit queue faster than the server can fill it, since the server is continuing to send the stream to the MAC at a rate of 4 Mbps. Client X's transmit queue becomes empty. In this situation, the MAC has allocated PCF time for this client but has no data to transmit. To ensure that no PCF time is wasted, the remaining time will be divided in to two, with one half redistributed to the other clients and the other half amended to the DCF period as shown in FIG. 22. This will allow other clients to increase their throughput if this pattern continues to occur. Note: this redistribution of time occurs in the same second that an empty transmit queue was detected (that is, after all clients have transmitted for this second, the next time around the initial static PCF time distribution will be restored and the process repeats over and over).

Now that the unused PCF time has been recycled, the MAC must report an increase in throughput to client X. Actual throughput has not really increased since the MAC ran out of data to transmit, but it can increase since the PHY transmission rate increased. The MAC must trick the ABFM layer into thinking that a throughput increase has occurred, so that it will upgrade the bit rate of the stream and take advantage of the higher throughput. The MAC will report the throughput of client X as if the MAC was transmitting during the PCF time that was recycled to DCF. I.e., client X's throughput=PHY transmission rate*(time spent transmitting to Client X before queue emptied+time recycled to DCF). This scenario can continue to happen every second until the ABFM layer actually upgrades the bit rate to client X. Client X can then fill it's transmit queues at a rate that keeps it non-empty, thus making use of all available bandwidth.

Figure 23:
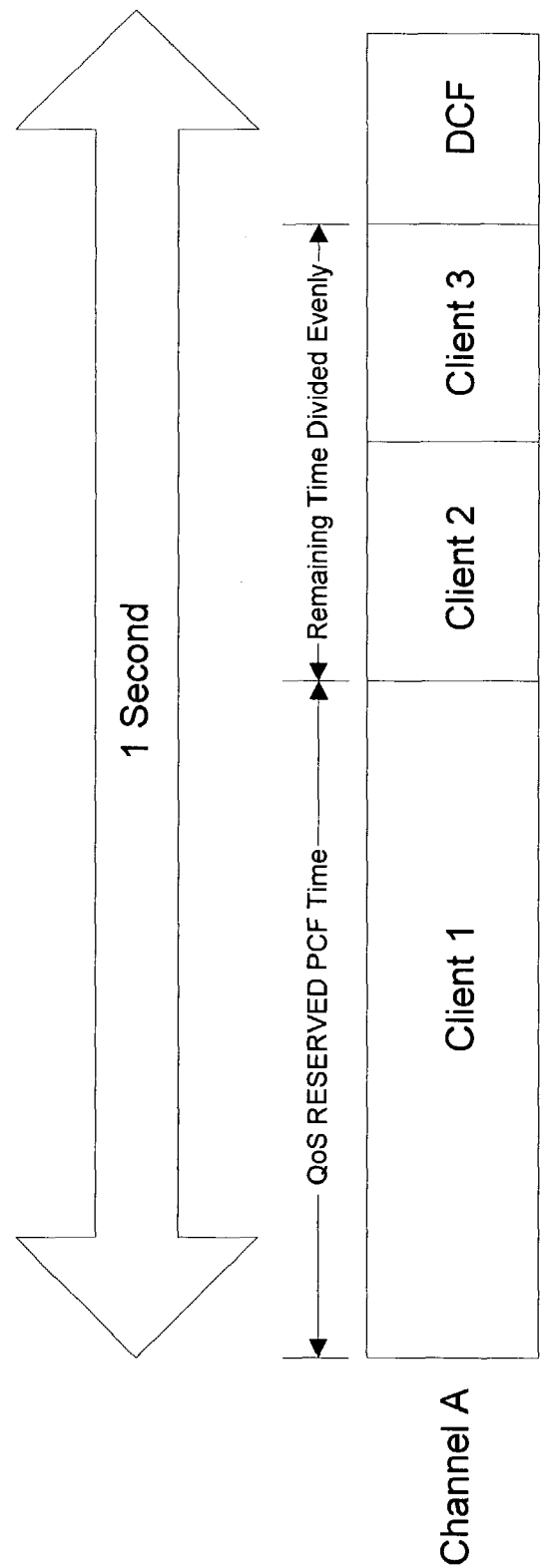
FIG. 23 depicts a PCF prioritization scheme in accordance with the present invention.

Quality of Service (QoS) is the server's way of giving priority to a particular client. QoS based priority is useful, for example, for "preferred" customers who have paid for more bandwidth or for clients who desire to reserve additional bandwidth for themselves (e.g., parents use preferred over their children's use). For the MAC this simply means allocating additional PCF time to a client. As discussed above, in PCF Time Division, when a client joins a channel the PCF time is divided evenly among all clients. If a client requires QoS based priority, the MAC will reserve a percentage of the overall PCF time to the QoS client and the remaining PCF time can be divided among the other clients. For example, as shown in FIG. 23, the remaining PCF time can be divided equally among the non-QoS priority clients. The details of exactly how much PCF time is reserved must still be determined, as well as what types of selections are available to the server for QoS priority clients.

In a transmit system having two transmit channels operating at the same time in accordance with the teachings of this invention, packet matching is performed by the MAC. One way to perform packet matching is to have the server pre-package all data packets in small denominations (e.g., 500 bytes). The MAC can then group these packets together as needed to compose the size required for a good match. An alternate solution is to have the server pre-package data packets in large denominations (e.g., 4 Kbytes). The MAC can then fragment these packets as needed to construct a match. The first approach has the advantage of moving the fragmentation to the server, keeping the MAC simple. However, it does incur the overhead of the server having to send more packets. The second approach requires the MAC to perform the fragmentation, which will yield a more accurate match, but is also considerably more complex to implement.

The embodiments of the present invention provide for moving clients amongst channels and for changing client access to the available channels (e.g., by removing an individual wireless device from having access to any and all channels). This capability is desirable because of the dynamic nature of wireless devices and their widely varying bandwidth requirements. For example, HDTV may require between 12 and 20 megabits per second (MBPS) while SDTV requires 3 to 6 MBPS. PDA's typically may require only half of the bandwidth required by HDTV or SDTV. Additionally, MPG II/cable may require 2 MBPS while DVD's may require 6 to 12 MBPS.

A first determination to be made for a wireless device being granted access to a WLAN is therefore a determination as to which channel to affiliate with the wireless device. This affiliation includes the step of assigning the client to a channel from the active channels. Typically, there are two channels to choose from. However, the present invention can be scaled for a greater number of channels. Two channels are typically used because of hardware cost limitations.

The simplest case for channel affiliation of a wireless device seeking to access a WLAN involves affiliating each new client device with the same initial channel(s). However, client devices may have different data rate requirements. At some point, lower bandwidth clients do not transmit or receive, creating dead time within their allocation. To remedy this situation, it is desirable to match clients according to their data rate to avoid slower data rate clients from receiving too much data, resulting in buffer overflows, while higher data rate clients are receiving too little amounts of data.

Another aspect to be considered in channel affiliation decisions is power or airtime allocation. Typically, wireless devices are relatively close to the base stations or access points. However, there may be instances where several of the wireless devices are close to the access points while one or more are located far away from the access points. In such a situation, the power associated with individual channels becomes a matter of concern not only for network performance, but also because of power usage.

For example, when numerous low bandwidth devices are coupled to a WLAN along with a high bandwidth device such as an HDTV, one channel may be assigned to the HDTV while the remaining devices are assigned the remaining secondary channel. However, if a low bandwidth device is located far from the base station or access point, a determination can be made as to what airtime resources the far device needs and can reasonably receive. Large bandwidth devices located close to the base station may actually require less airtime than a low bandwidth device that is remotely located. For these reasons the DCF, first come, first served process, fails, while a PCF technique may be utilized to optimize bandwidth, signal strength, airtime or other like factors. PCF is thus preferable for large bandwidth clients, and for clients that require special signal strength or airtime considerations.

Wireless communication systems are typically designed for non-multimedia data transmissions. The embodiments of the present invention provide for high data rate transmissions, such as are associated with multimedia and video applications, within any network environment, and in particular within a network environment typically used for relatively low data rate applications. Channel resources can be initially affiliated and subsequently allocated based on the varying needs of multiple client devices and the desires of a user to ensure that channel resources are distributed in a systematic manner. For example, channel resource allocation can be prioritized arbitrarily, or can be prioritized in accordance with a preset criteria. Further, channel resources can be allocated in accordance with a weighting system, or can be distributed evenly. Alternatively, any other distribution scheme can be implemented and is contemplated to be within the scope of this invention. Although the above description discusses a two-channel device, multiple channels may be used.

The present invention thus provides a method and apparatus for affiliating a wireless device with a WLAN that reduce or eliminate the problems of prior art channel affiliation and allocation methods and systems. As one of average skill in the art will appreciate, other embodiments may be derived from the teaching of the present invention, without deviating from the scope of the claims.

What is claimed is:

1. A method for affiliating a wireless device with a wireless local area network (WLAN), the method comprises:
   receiving, by a control node, identification information of a wireless device via at least one access frequency in the WLAN;
   determining, by the control node, authenticity of the wireless device based on the identification information provided by the wireless device;
   selecting, by the control node, an initial access channel from a set of access channels based on data rate requirements of the wireless device and load on the set of access channels, wherein each channel in the set of access channels includes point coordination function (PCF) access time and distributed coordination function (DCF) access time and wherein selecting by the control node an initial access channel from a set of access channels includes:
      determining by the control node data rate requirements of the wireless device and quality of service (QoS) priority;
      assigning the wireless device to an initial access channel whose transmission rate sum is lowest in the set of access channels; and
      allocating point coordination function (PCF) access time on the initial access channel evenly between the wireless device and other wireless devices allocated to the initial access channel having a same QoS priority; and
   affiliating, by the control node, the wireless device with the initial access channel from the set of access channels when authenticity is determined.

2. The method for affiliating a wireless device with a wireless local area network (WLAN), the method comprises:
   receiving, by a control node, identification information of a wireless device via at least one access frequency in the WLAN;
   determining, by the control node, authenticity of the wireless device based on the identification information provided by the wireless device;
   selecting, by the control node, an initial access channel from a set of access channels based on data rate requirements of the wireless device and load on the set of access channels, wherein each channel in the set of access channels includes point coordination function (PCF) access time and distributed coordination function (DCF) access time and wherein selecting by the control node an initial access channel from a set of access channels includes:
      determining by the control node data rate requirements of the wireless device; and
      assigning the wireless device to an initial access channel whose transmission rate sum is lowest in the set of access channels;
      reserving a percentage of the point coordination function (PCF) access time on the initial access channel to the wireless device based on quality of service (QoS) priority of the wireless device; and
      allocating remaining point coordination function (PCF) access time on the initial access channel evenly between other wireless devices allocated to the initial access channel having lower QoS priority; and
   affiliating, by the control node, the wireless device with the initial access channel from the set of access channels when authenticity is determined.

3. A method for affiliating a wireless device with a wireless local area network (WLAN), the method comprises:
   receiving, by a control node, identification information of a wireless device via at least one access frequency in the WLAN;
   determining, by the control node, authenticity of the wireless device based on the identification information provided by the wireless device;
   selecting, by the control node, an initial access channel from a set of access channels based on data rate requirements of the wireless device and load on the set of access channels, wherein each channel in the set of access channels includes point coordination function (PCF) access time and distributed coordination function (DCF) access time and wherein selecting by the control node an initial access channel from the set of access channels includes:
      determining by the control node data rate requirements of the wireless device;
      assigning the wireless device to an initial access channel whose transmission rate sum is lowest in the set of access channels; and
      allocating point coordination function (PCF) access time on the initial access channel to the wireless device based on quality of service priority of the wireless device;

affiliating, by the control node, the wireless device with the initial access channel from the set of access channels when authenticity is determined; and reallocating by the control node the wireless device to a second access channel, from the set of access channels, different from the initial access channel in response to data rate requirements of the wireless device and load on the set of access channels.

* * * * *